US012657493B2

(12) United States Patent     (10) Patent No.:   US 12,657,493 B2

Klimov et al.     (45) Date of Patent:     Jun. 16, 2026

(54) GENERATIVE MODELING OF QUANTUM HARDWARE

(71) Applicant: Google LLC, Mountain View, CA (US)

(72) Inventors: Paul Victor Klimov, Santa Barbara, CA (US); Anthony Edward Megrant, Goleta, CA (US); Andrew Lorne Dunsworth, Goleta, CA (US); Julian Shaw Kelly, Santa Barbara, CA (US)

(73) Assignee: GOOGLE LLC, Mountain View, CA (US)

( * ) Notice: Subject to any disclaimer, the term of this patent is extended or adjusted under 35 U.S.C. 154(b) by 707 days.

(21) Appl. No.: 18/005,493

(22) PCT Filed: Jul. 14, 2021

(86) PCT No.: PCT/US2021/041542

§ 371 (c)(1),
(2) Date: Jan. 13, 2023

(87) PCT Pub. No.: WO2022/051030

PCT Pub. Date: Mar. 10, 2022

(65) Prior Publication Data

US 2023/0259802 A1     Aug. 17, 2023

Related U.S. Application Data

(60) Provisional application No. 63/052,161, filed on Jul. 15, 2020.

(51) Int. Cl.
*G06N 10/20*     (2022.01)
*G06N 10/60*     (2022.01)

(52) U.S. Cl.
CPC ............. *G06N 10/20* (2022.01); *G06N 10/60* (2022.01)

(58) Field of Classification Search
CPC ...................................................... G06N 10/20
(Continued)

(56) References Cited

U.S. PATENT DOCUMENTS

| | | | |
|---|---|---|---|
| 7,428,514 B2 | 9/2008 | Jin et al. | |
| 10,423,888 B1 | 9/2019 | Hertzberg et al. | |
| 11,074,382 B2 | 7/2021 | Paik et al. | |
| 11,175,971 B1 * | 11/2021 | Lee | G06F 9/547 |
| 11,655,498 B2 * | 5/2023 | Ricke | G16B 20/00 |
| | | | 702/19 |

(Continued)

FOREIGN PATENT DOCUMENTS

| | | | | |
|---|---|---|---|---|
| AU | 2017222925 B2 * | 11/2021 | ............. | A61B 5/702 |
| CA | 3114668 A1 * | 4/2020 | ....... | G01N 33/56911 |

(Continued)

OTHER PUBLICATIONS

International Preliminary Report on Patentability for Application No. PCT/US2021/041542, mailed Jan. 26, 2023, 14 pages.
(Continued)

*Primary Examiner* — Ruay Ho
(74) *Attorney, Agent, or Firm* — DORITY & MANNING P.A.

(57) ABSTRACT

A computer-implemented method for simulating quantum hardware performance can include accessing, by a computing system including one or more computing devices, a quantum hardware sample generation model configured to generate quantum hardware samples. The quantum hardware sample generation model can include one or more quantum hardware parameters. The computer-implemented method can include sampling, by the computing system, a quantum hardware sample from the quantum hardware sample generation model. The computer-implemented method can include obtaining, by the computing system, one or more simulated performance measurements based at least in part on the quantum hardware sample.

20 Claims, 13 Drawing Sheets

(58) Field of Classification Search
USPC ............................................. 706/62; 702/19
See application file for complete search history.

(56) References Cited

U.S. PATENT DOCUMENTS

| | | | | |
|---|---|---|---|---|
| 11,875,222 | B1* | 1/2024 | Reagor .................. | G06N 10/20 |
| 2016/0328253 | A1* | 11/2016 | Majumdar ............. | G06N 10/80 |
| 2017/0017894 | A1* | 1/2017 | Lanting .................. | G06N 10/70 |
| 2018/0240032 | A1* | 8/2018 | Van Rooyen .......... | G16B 30/00 |
| 2020/0334107 | A1* | 10/2020 | Katabarwa ............. | G06N 10/20 |
| 2020/0379768 | A1* | 12/2020 | Berkley ................ | G06F 9/3838 |
| 2021/0010953 | A1* | 1/2021 | Adler ..................... | G06F 30/398 |
| 2021/0334689 | A1 | 10/2021 | Klimov et al. | |
| 2022/0246677 | A1 | 8/2022 | Kelly et al. | |
| 2022/0414514 | A1 | 12/2022 | Korotkov et al. | |

FOREIGN PATENT DOCUMENTS

| | | | | | |
|---|---|---|---|---|---|
| CA | 3085717 | C | * | 4/2023 | ............. G06N 10/70 |
| JP | 2006/344200 | | | 12/2006 | |

OTHER PUBLICATIONS

Ahsan et al., "Designing a Million-Qubit Quantum Computer Using a Resource Performance Simulator", ACM Journal on Emerging Technologies in Computing Systems (JETC), vol. 12, No. 4, Dec. 2015, 25 Pages.

International Search Report for Application No. PCT/US2021/041542, mailed May 9, 2022, 6 pages.

Menon et al., "Auto-tuning Parameter Choices in HPC Applications using Bayesian Optimization", 2020 IEEE International Parallel and Distributed Processing Symposium (IPDPS), IEEE, May 18, 2020, 10 Pages.

Moullec et al., "Towards System Architecture Generation and Performances Assessment Under Uncertainty Using Bayesian Networks", Journal of Mechanical Design, vol. 135, No. 4, Apr. 1, 2013, 38 Pages.

Kansakar et al., "A Design Space Exploration Methodology for Parameter Optimization in Multicore Processors", arXiv: 1803.04786v1, Feb. 28, 2018.

* cited by examiner

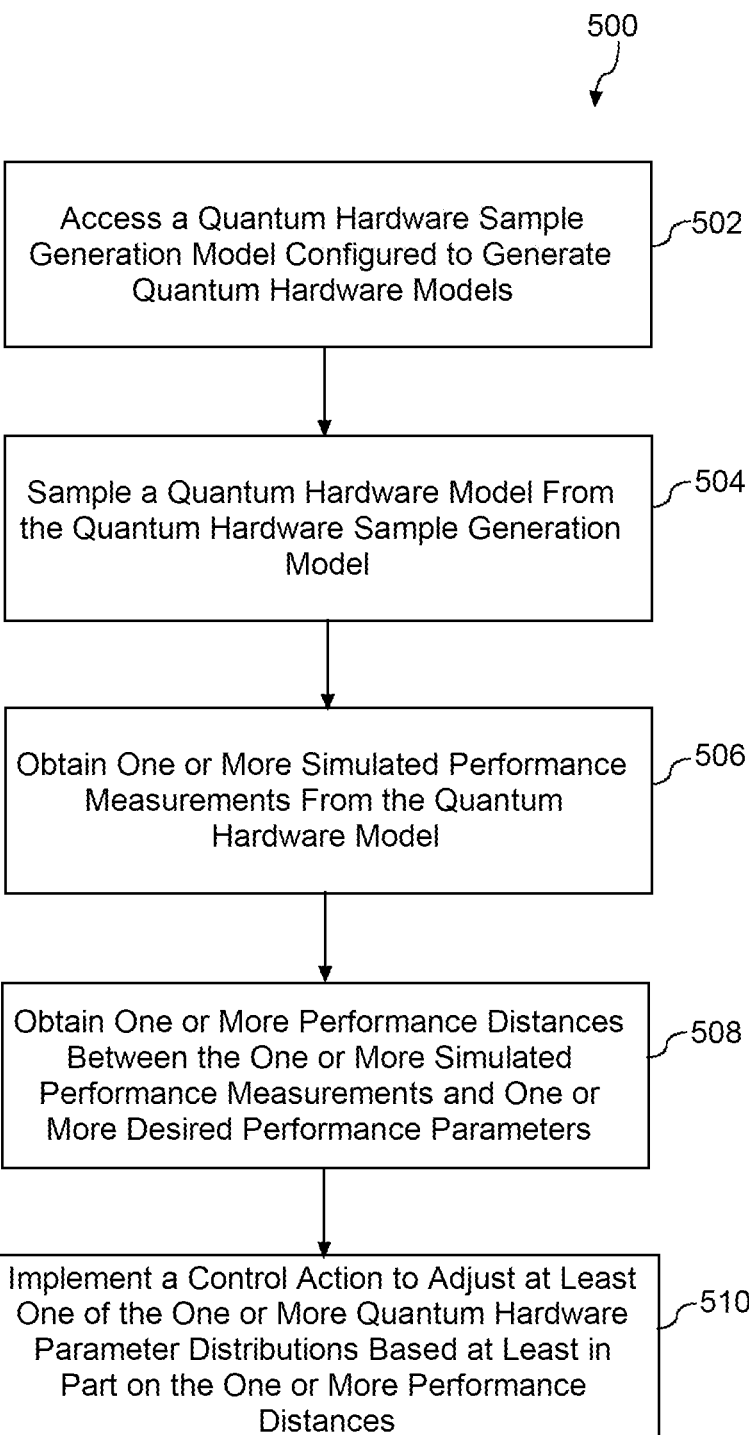

500

Access a Quantum Hardware Sample Generation Model Configured to Generate Quantum Hardware Models ⌐502

Sample a Quantum Hardware Model From the Quantum Hardware Sample Generation Model ⌐504

Obtain One or More Simulated Performance Measurements From the Quantum Hardware Model ⌐506

Obtain One or More Performance Distances Between the One or More Simulated Performance Measurements and One or More Desired Performance Parameters ⌐508

Implement a Control Action to Adjust at Least One of the One or More Quantum Hardware Parameter Distributions Based at Least in Part on the One or More Performance Distances ⌐510

Access a Quantum Hardware Sample Generation Model Configured to Generate Quantum Hardware Models, the Quantum Hardware Sample Generation Model Including a Statistical Network of One or More Quantum Hardware Parameter Distributions and One or More Quantum Hardware Parameter Dependencies ⌐602

Sample the Quantum Hardware Sample Generation Model to Obtain a Quantum Hardware Model by Sampling One or More Parameter Samples From Each of the One or More Quantum Hardware Parameter Distributions and Propagating the One or More Parameter Samples Through the Statistical Network Based on the One or More Quantum Hardware Parameter Dependencies ⌐604

FIG. 6

GENERATIVE MODELING OF QUANTUM HARDWARE

PRIORITY CLAIM

This application is based upon and claims the right of priority under 35 U.S.C. § 371 to International Application No. PCT/US2021/041542 filed on Jul. 14, 2021, which claims the benefit of U.S. Provisional Application Ser. No. 63/052,161 filed Jul. 15, 2020. Applicant claims priority to and the benefit of each of such applications and incorporates all such applications herein by reference in their entirety.

FIELD

The present disclosure relates generally to quantum computing, such as systems and methods for generative modeling of quantum hardware.

BACKGROUND

Quantum computing is a computing method that takes advantage of quantum effects, such as superposition of basis states and entanglement to perform certain computations more efficiently than a classical digital computer. In contrast to a digital computer, which stores and manipulates information in the form of bits, e.g., a "1" or "0," quantum computing systems can manipulate information using quantum bits ("qubits"). A qubit can refer to a quantum device that enables the superposition of multiple states, e.g., data in both the "0" and "1" state, and/or to the superposition of data, itself, in the multiple states. In accordance with conventional terminology, the superposition of a "0" and "1" state in a quantum system may be represented, e.g., as a $|0\rangle + b|1\rangle$ The "0" and "1" states of a digital computer are analogous to the $|0\rangle$ and $|1\rangle$ basis states, respectively of a qubit.

SUMMARY

Aspects and advantages of embodiments of the present disclosure will be set forth in part in the following description, or can be learned from the description, or can be learned through practice of the embodiments.

One example aspect of the present disclosure is directed to a computing system configured to generate a quantum hardware sample. The computing system can include one or more processors and one or more memory devices. The one or more memory devices can store computer-readable data defining a quantum hardware sample generation model and instructions that, when implemented, cause the quantum hardware sample generation model to provide a quantum hardware sample. The quantum hardware sample generation model can include one or more quantum hardware parameter distributions. The quantum hardware sample generation model can include one or more quantum hardware parameter dependencies defining relationships between the one or more quantum hardware parameter distributions. The one or more quantum hardware parameter distributions and one or more quantum hardware parameter dependencies can define a statistical network including a hardware distribution that, when sampled, produces a quantum hardware sample. The quantum hardware sample can be configured to model performance of quantum hardware.

Another example aspect of the present disclosure is directed to a computer-implemented method for simulating quantum hardware performance. The computer-implemented method can include accessing, by a computing system including one or more computing devices, a quantum hardware sample generation model configured to generate quantum hardware samples. The quantum hardware sample generation model can include one or more quantum hardware parameters. The computer-implemented method can include sampling, by the computing system, a quantum hardware sample from the quantum hardware sample generation model. The computer-implemented method can include obtaining, by the computing system, one or more simulated performance measurements based at least in part on the quantum hardware sample.

Another example aspect of the present disclosure is directed to a computer-implemented method for generating quantum hardware samples simulating performance of quantum hardware. The computer-implemented method can include accessing, by a computing system including one or more computing devices, a quantum hardware sample generation model configured to generate quantum hardware samples. The quantum hardware sample generation model can include a statistical network of one or more quantum hardware parameter distributions and one or more quantum hardware parameter dependencies. The computer-implemented method can include sampling, by the computing system, the quantum hardware sample generation model to obtain a quantum hardware sample. Sampling the quantum hardware sample generation model can include sampling one or more parameter samples from each of the one or more quantum hardware parameter distributions and propagating the one or more parameter samples through the statistical network based on the one or more quantum hardware parameter dependencies.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 5 depicts a flowchart diagram of an example computer-implemented method for simulating quantum hardware performance according to example embodiments of the present disclosure.

FIG. 6 depicts a flowchart diagram of an example computer-implemented method for generating quantum hardware samples simulating performance of quantum hardware according to example embodiments of the present disclosure.

Figure 1:
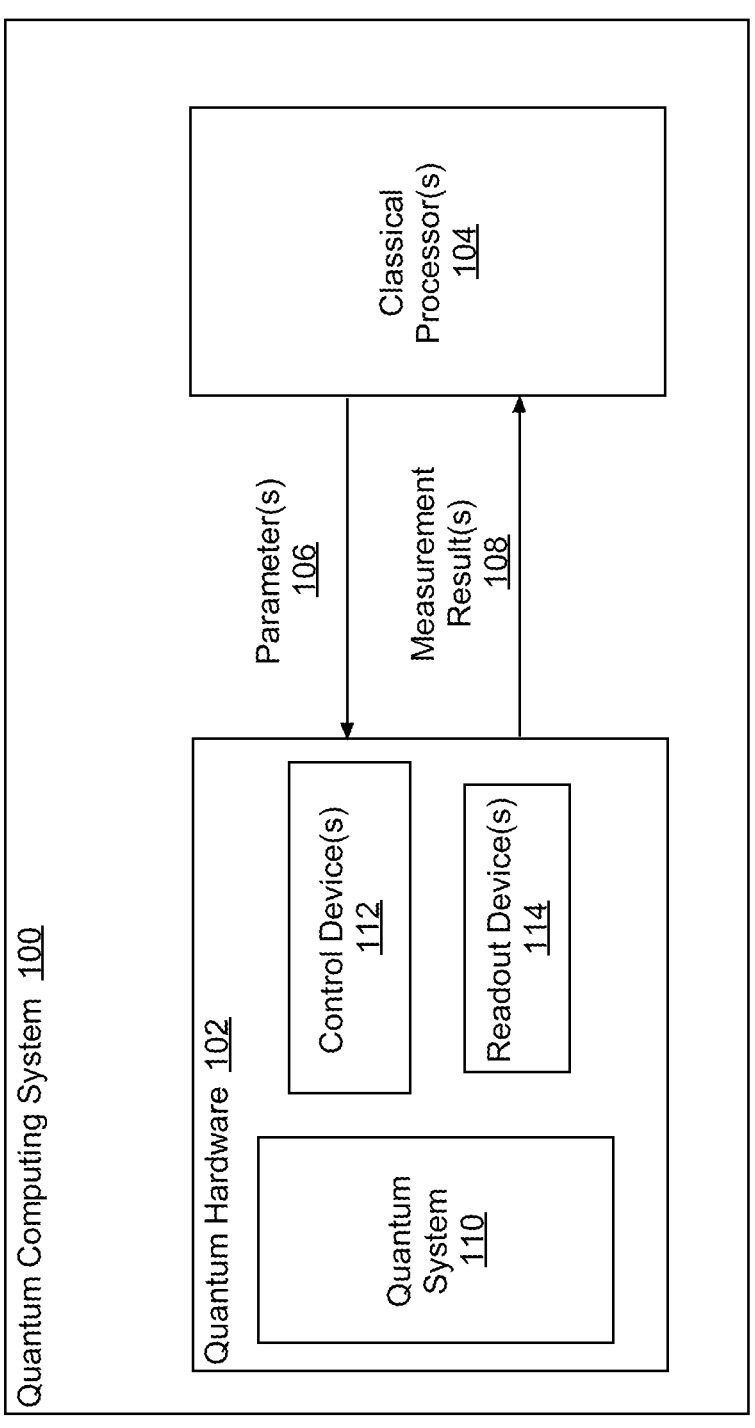
FIG. 1 depicts a block diagram of an example quantum computing system according to example embodiments of the present disclosure.

Reference numerals that are repeated across plural figures are intended to identify the same features in various implementations.

DETAILED DESCRIPTION

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Quantum hardware design can be a time-consuming and expensive procedure. For example, one aspect of quantum hardware design can include developing circuit design parameters (e.g., josephson junction resistances, mutual inductances or coupling capacitances between control lines and qubits, coupling capacitances between qubits, etc.) that are of satisfactory values to provide desired operating parameters (e.g., single-qubit and/or two-qubit gate frequencies, such as in frequency-tunable superconducting transmon qubits) to perform quantum algorithms with high fidelity, quality, reliability, repeatability, etc. Thus, testing choices of circuit design parameters can require developing and prototyping an entire quantum processor, which can be an expensive process. In some cases, human intuition can substitute for some evaluation steps, but human intuition can be unreliable, especially as quantum hardware scales to increasingly larger size. Furthermore, it can be challenging to propagate all aspects of design (e.g., uncertainty) through complex probabilistic relationships having increasingly larger numbers of dependencies and/or scope.

Example aspects of the present disclosure are directed to generative modeling of quantum hardware (e.g., quantum processors including one or more qubits). According to example aspects of the present disclosure, a quantum hardware sample that can be used to simulate behavior and/or performance of quantum hardware can be generated by a quantum hardware sample generation model. Quantum hardware parameters can be modeled by arbitrary (e.g., designed) and/or empirically measured distributions over random variables. The quantum hardware sample generation model can include a statistical network (e.g., a Bayesian network) that relates the quantum hardware parameter distributions as a plurality of nodes (e.g., quantum hardware parameter distributions) connected by edges and/or dependencies (e.g., quantum hardware parameter dependencies). For instance, dependencies (e.g., conditional dependencies) can be defined between the quantum hardware parameter distributions based on known and/or understood dependencies in quantum hardware. Additionally and/or alternatively, quantum hardware parameters with unknown dependencies can be treated as independent distributions. Additionally and/or alternatively, in some implementations (e.g., in the presence of sufficient available training data), machine-learned modeling techniques, such as the use of neural networks, can be employed to generate and/or otherwise provide insight on quantum hardware parameter dependencies. For example, parameters and/or dependencies of the statistical network can be learned by application of machine-learned modeling and/or training techniques.

The statistical network can include, as an ultimate output, a hardware distribution (e.g., a hardware distribution node) that is conditionally dependent on some or all of the quantum hardware parameter distributions (e.g., directly and/or through intermediate distributions). The hardware distribution can be sampled (e.g., by a prior sampling process) to produce quantum hardware samples. The probabilistic approach to modeling of including a statistical (e.g., Bayesian) network of distributions can more accurately model variances between individual instances of quantum hardware, as seen in manufactured quantum hardware. This can allow for an improved (e.g., more accurate) design process compared to, for example, including only single (e.g., fixed and/or nonrandom) parameters.

For instance, a computing system can be configured to generate a quantum hardware sample. The computing system can include one or more processors and/or one or more memory devices. The one or more memory devices can store computer-readable data defining a quantum hardware sample generation model and instructions that, when implemented, cause the quantum hardware sample generation model to provide a quantum hardware sample. The quantum hardware sample can be a simulated sample of quantum hardware according to quantum hardware parameter distributions and/or dependencies.

The quantum hardware sample generation model can include one or more quantum hardware parameter distributions. In some implementations, the one or more quantum hardware parameter distributions can include one or more empirically measured quantum hardware parameter distributions. For instance, the empirically measured quantum hardware parameter distributions can be empirically measured from performance of actual (e.g., fabricated) quantum hardware. In some implementations, the one or more quantum hardware parameter distributions can include one or more designed quantum hardware parameter distributions. For instance, the designed quantum hardware parameter distributions can be specified and/or otherwise produced based on target performance, expected performance, etc., such as in place of empirical measurement.

In some implementations, the one or more quantum hardware parameter distributions can include at least one of one or more circuit parameters, one or more electrical parameters, one or more fabrication parameters, and/or one or more defect parameters. For instance, in some implementations, the one or more quantum hardware parameter distributions can include at least one of capacitance (e.g., qubit self-capacitance), junction resistance (e.g., josephson junction resistance), qubit anharmonicity, qubit-control mutual inductance distribution, maximum frequency, readout-resonator frequency, josephson-junction asymmetry, two-level-system (TLS) TLS number density, TLS frequency, TLS coherence, TLS qubit-decoupling, qubit quality, qubit-control mutual inductance prime distribution, drive impedance, resonator internal quality, resonator coupling quality, resonator-qubit coupling efficiency, bandpass filter frequency, bandpass filter quality, transmon frequency, T1 spectrum, single qubit frequency, or qubit grid frequency. In some implementations, the quantum hardware sample generation model can be or can include a joint probability distribution over the quantum hardware parameter distributions.

Additionally and/or alternatively, the quantum hardware sample generation model can include one or more quantum hardware parameter dependencies defining relationships between the one or more quantum hardware parameter distributions. The one or more quantum hardware parameter distributions and one or more quantum hardware parameter dependencies can define a statistical network including a hardware distribution that, when sampled, produces a quantum hardware sample. In some implementations, the statistical network can be or can include a Bayesian network. In some implementations, the one or more quantum hardware parameter dependencies can include one or more conditionally independent relationships between quantum hardware parameter distributions having unknown dependencies and/or one or more conditionally dependent relationships relating quantum hardware parameter distributions based on known dependencies.

In some implementations, the quantum hardware sample generation model can include a machine-learned quantum hardware sample generation model. For instance, the one or more quantum hardware parameter dependencies can be learned based at least in part on training the machine-learned quantum hardware sample generation model. Additionally and/or alternatively, the statistical network can be or can include a machine-learned neural network The quantum hardware sample can represent performance of quantum hardware, such as a quantum processor including one or more qubits. For example, the quantum hardware sample can include some or all information about a theoretical instance of quantum hardware that is useful to estimate the performance of the quantum hardware. The information can include various parameters, such as single numbers, a plurality (e.g., database of) parameters, relationships, etc. For instance, in some implementations, the quantum hardware sample can include and/or otherwise be useful in defining a plurality of sub-models each configured to predict and/or otherwise illustrate behavior of at least one of a plurality of performance metrics of quantum hardware. For example, the plurality of performance metrics can include frequency-dependent T1 relaxation, frequency-dependent T2 dephasing, and/or any other suitable performance metrics.

A computing system can implement (e.g., by one or more processors implementing one or more instructions) a computer-implemented method for simulating quantum hardware performance.

The computer-implemented method can include accessing (e.g., by a computing system including one or more computing devices) a quantum hardware sample generation model configured to generate quantum hardware samples. The quantum hardware sample generation model can include one or more quantum hardware parameters.

Additionally and/or alternatively, the computer-implemented method can include sampling (e.g., by the computing system) a quantum hardware sample from the quantum hardware sample generation model. In some implementations, sampling the quantum hardware sample from the quantum hardware sample generation model can include sampling one or more parameter samples from each of the one or more quantum hardware parameter distributions and/or propagating the one or more parameter samples through a statistical network including one or more quantum hardware parameter dependencies. In some implementations, sampling the one or more parameter samples can include prior sampling the one or more parameter samples.

Additionally and/or alternatively, the computer-implemented method can include obtaining (e.g., by the computing system) one or more simulated performance measurements based at least in part on the quantum hardware sample.

For instance, in some implementations, obtaining the one or more simulated performance measurements can include determining (e.g., by the computing system) one or more operating parameters using an optimization algorithm and simulating (e.g., by the computing system) the one or more simulated performance measurements based at least in part on the one or more operating parameters. For instance, in some implementations, the one or more operating parameters can include one or more operating frequencies.

Additionally and/or alternatively, in some implementations, obtaining the one or more simulated performance measurements from the quantum hardware sample can include providing (e.g., by the computing system) the quantum hardware sample to a quantum circuit simulator system. The quantum circuit simulator system can be configured to simulate performance of the quantum hardware sample with respect to one or more quantum test algorithms. For example, the quantum tests algorithms can be any one or more quantum algorithms that can be suitable to evaluate performance of the quantum hardware sample. For example, a quantum test algorithm can be or can include an algorithm (e.g., an at least partially and/or purely classical and/or quantum algorithm) that can be used to assess the performance of the quantum hardware for one or more quantum algorithms of interest. Additionally and/or alternatively, in some implementations, obtaining the one or more simulated performance measurements can include obtaining (e.g., by the computing system) from the quantum circuit simulator system, one or more algorithm errors with respect to the one or more test algorithms.

Additionally and/or alternatively, the computer-implemented method can include obtaining (e.g., by the computing system) one or more performance distances between the one or more simulated performance measurements and one or more target performance measurements.

Additionally and/or alternatively, the computer-implemented method can include implementing (e.g., by the computing system) a control action to adjust at least one of the one or more quantum hardware parameter distributions based at least in part on the one or more performance distances. For instance, in some implementations, the control action can be or can include any one or more of incrementing, decrementing, shifting, stretching, replacing, and/or changing distribution type of at least one of the one or more quantum hardware parameter distributions.

A computing system can implement (e.g., by one or more processors implementing one or more instructions) a computer-implemented method for generating quantum hardware samples simulating performance of quantum hardware.

The computer-implemented method can include accessing (e.g., by a computing system including one or more computing devices) a quantum hardware sample generation model configured to generate quantum hardware samples. The quantum hardware sample generation model can include a statistical network of one or more quantum hardware parameter distributions and one or more quantum hardware parameter dependencies.

Additionally and/or alternatively, the computer-implemented method can include sampling (e.g., by the computing system) the quantum hardware sample generation model to obtain a quantum hardware sample. Sampling the quantum hardware sample generation model can include sampling one or more parameter samples from each of the one or more quantum hardware parameter distributions and/or propagating the one or more parameter samples through the statistical network based on the one or more quantum hardware parameter dependencies.

Aspects of the present disclosure provide numerous technical effects and benefits. The quantum hardware samples can be used to simulate and design quantum hardware, including quantum hardware that may be impractical to design or test using a physical prototype. As one example, the quantum hardware samples can be scalable to a large number of qubits. This can allow for generation of quantum hardware samples that can be used to evaluate performance of quantum algorithms on quantum hardware that is significantly larger than contemporary systems. For example, if quantum hardware systems generally have on the order of hundreds of qubits that perform reliable operation, quantum hardware samples can be generated that simulate quantum hardware with thousands of qubits or greater. Thus, the quantum hardware samples can facilitate evaluation of quantum hardware architecture and/or designs at qubit sizes that may be impractical to produce. Additionally, the quantum hardware samples can offer a reduced cost during a design process of quantum hardware. For instance, the quantum hardware samples can reduce fabrication costs associated with physical prototypes and/or revisions to physical prototypes.

According to example aspects of the present disclosure, an optimization algorithm can determine operating parameters for the quantum hardware sample. Performance of the quantum hardware sample can be evaluated at the operating parameters. For example, in some implementations, an evaluation model can estimate the performance of quantum hardware represented by the quantum hardware sample based on the operating parameters. This can be useful, for instance, for determining operating parameters of prototype hardware, evaluating quality of prototype hardware, etc. Additionally, the optimization algorithm can be useful for evaluating feasibility of development of quantum hardware according to the quantum hardware sample. For instance, if the performance of the quantum hardware sample is satisfactory, then real quantum hardware (e.g., quantum processors) can be developed, fabricated, etc. according to the quantum hardware parameter distributions. Additionally, the quantum hardware sample can be indicative of potential complications (e.g., recursions) for a particular architecture, at a particular scaling, etc. without requiring development of physical hardware according to the parameters of the quantum hardware sample. For instance, if the performance of the quantum hardware sample is unsatisfactory (e.g., desired performance of target algorithm(s) is not achieved) the architecture (e.g., parameters, dependencies, etc.) can be adjusted and/or the quantum hardware sample generation model can be resampled until the quantum hardware sample exhibits desirable performance.

FIG. 1 depicts an example quantum computing system 100. The example system 100 is an example of a system on one or more classical computers or quantum computing devices in one or more locations, in which the systems, components, and techniques described below can be implemented. Those of ordinary skill in the art, using the disclosures provided herein, will understand that other quantum computing structures or systems can be used without deviating from the scope of the present disclosure. For instance, quantum hardware samples can be configured to simulate behavior of the quantum computing system 100 (e.g., the quantum hardware 102) and/or any other suitable quantum computing system in accordance with example aspects of the present disclosure.

The system 100 includes quantum hardware 102 in data communication with one or more classical processors 104. The quantum hardware 102 includes components for performing quantum computation. For example, the quantum hardware 102 includes a quantum system 110, control device(s) 112, and readout device(s) 114 (e.g., readout resonator(s)). The quantum system 110 can include one or more multi-level quantum subsystems, such as a register of qubits. In some implementations, the multi-level quantum subsystems can include superconducting qubits, such as flux qubits, charge qubits, transmon qubits, gmon qubits, etc.

The type of multi-level quantum subsystems that the system 100 utilizes may vary. For example, in some cases it may be convenient to include one or more readout device(s) 114 attached to one or more superconducting qubits, e.g., transmon, flux, gmon, xmon, or other qubits. In other cases, ion traps, photonic devices or superconducting cavities (with which states may be prepared without requiring qubits) may be used. Further examples of realizations of multi-level quantum subsystems include fluxmon qubits, silicon quantum dots or phosphorus impurity qubits.

Quantum circuits may be constructed and applied to the register of qubits included in the quantum system 110 via multiple control lines that are coupled to one or more control devices 112. Example control devices 112 that operate on the register of qubits can be used to implement quantum logic gates or circuits of quantum logic gates, e.g., Pauli gates, Hadamard gates, controlled-NOT (CNOT) gates, controlled-phase gates, T gates, multi-qubit quantum gates, coupler quantum gates, etc. The one or more control devices 112 may be configured to operate on the quantum system 110 through one or more respective control parameters (e.g., one or more physical control parameters). For example, in some implementations, the multi-level quantum subsystems may be superconducting qubits and the control devices 112 may be configured to provide control pulses to control lines to generate magnetic fields to adjust a frequency of the qubits.

The quantum hardware 102 may further include readout devices 114 (e.g., readout resonators). Measurement results 108 obtained via measurement devices may be provided to the classical processors 104 for processing and analyzing. In some implementations, the quantum hardware 102 may include a quantum circuit and the control device(s) 112 and readout devices(s) 114 may implement one or more quantum logic gates that operate on the quantum system 102 through physical control parameters (e.g., microwave pulse) that are sent through wires included in the quantum hardware 102. Further examples of control devices include arbitrary waveform generators, wherein a DAC (digital to analog converter) creates the signal.

The readout device(s) 114 may be configured to perform quantum measurements on the quantum system 110 and send measurement results 108 to the classical processors 104. In addition, the quantum hardware 102 may be configured to receive data specifying physical control qubit parameter values 106 from the classical processors 104. The quantum hardware 102 may use the received physical control qubit parameter values 106 to update the action of the control device(s) 112 and readout devices(s) 114 on the quantum system 110. For example, the quantum hardware 102 may receive data specifying new values representing voltage strengths of one or more DACs included in the control devices 112 and may update the action of the DACs on the quantum system 110 accordingly. The classical processors 104 may be configured to initialize the quantum system 110 in an initial quantum state, e.g., by sending data to the quantum hardware 102 specifying an initial set of parameters 106.

The readout device(s) 114 can take advantage of a difference in the impedance for the $|0\rangle$ and $|1\rangle$ states of an element of the quantum system, such as a qubit, to measure the state of the element (e.g., the qubit). For example, the resonance frequency of a readout resonator can take on different values when a qubit is in the state $|0\rangle$ or the state $|1\rangle$, due to the nonlinearity of the qubit. Therefore, a microwave pulse reflected from the readout device 114 carries an amplitude and phase shift that depend on the qubit state. In some implementations, a Purcell filter can be used in conjunction with the readout device(s) 114 to impede microwave propagation at the qubit frequency.

FIG. 2 depicts a block diagram of an example quantum hardware sample generation model system 200 according to example embodiments of the present disclosure. For instance, quantum hardware generation model system 200 can include quantum hardware sample generation model 202. Quantum hardware sample generation model 202 can be sampled to produce a quantum hardware sample, in accordance with example aspects of the present disclosure. In some implementations, quantum hardware sample generation model 202 can be stored in one or more computer-readable memory devices as computer-readable data.

Quantum hardware sample generation model 202 can include one or more quantum hardware parameter distributions 210. Each of the quantum hardware parameter distributions 210 can model a statistical distribution of a quantum hardware parameter. For example, the quantum hardware parameter distributions 210 can model distributions representative of variances in parameters during fabrication, manufacturing, operation, etc. of quantum hardware. The quantum hardware parameter distributions 210 can be empirically measured (e.g., from a plurality of physical quantum hardware) and/or designed, and/or determined in any other suitable manner in accordance with example aspects of the present disclosure. For example, in some embodiments, the one or more quantum hardware parameter distributions 210 can include one or more empirically measured quantum hardware parameter distributions. Additionally and/or alternatively, in some embodiments, the one or more quantum hardware parameter distributions can include one or more designed quantum hardware parameter distributions.

In some embodiments, the quantum hardware parameter distributions 210 can be or can include at least one of one or more circuit parameters, one or more electrical parameters, one or more fabrication parameters, or one or more defect parameters. The quantum hardware parameter distributions, in some implementations, can include at least one of a qubit distribution, qubit circuit distribution, qubit relaxation distribution, or background loss distribution. In some implementations, the one or more quantum hardware parameter distributions can include at least one of capacitance (e.g., qubit self-capacitance), junction resistance (e.g., josephson junction resistance), qubit anharmonicity, qubit-control mutual inductance distribution, maximum frequency, readout-resonator frequency, josephson-junction asymmetry, two-level-system (TLS) TLS number density, TLS frequency, TLS coherence, TLS qubit-decoupling, qubit quality, qubit-control mutual inductance prime distribution, drive impedance, resonator internal quality, resonator coupling quality, resonator-qubit coupling efficiency, bandpass filter frequency, bandpass filter quality, transmon frequency, T1 spectrum, single qubit frequency, or qubit grid frequency. In some implementations, the quantum hardware sample generation model 202 can be or can include a joint probability distribution over the quantum hardware parameter distributions 210.

Figure 2A:
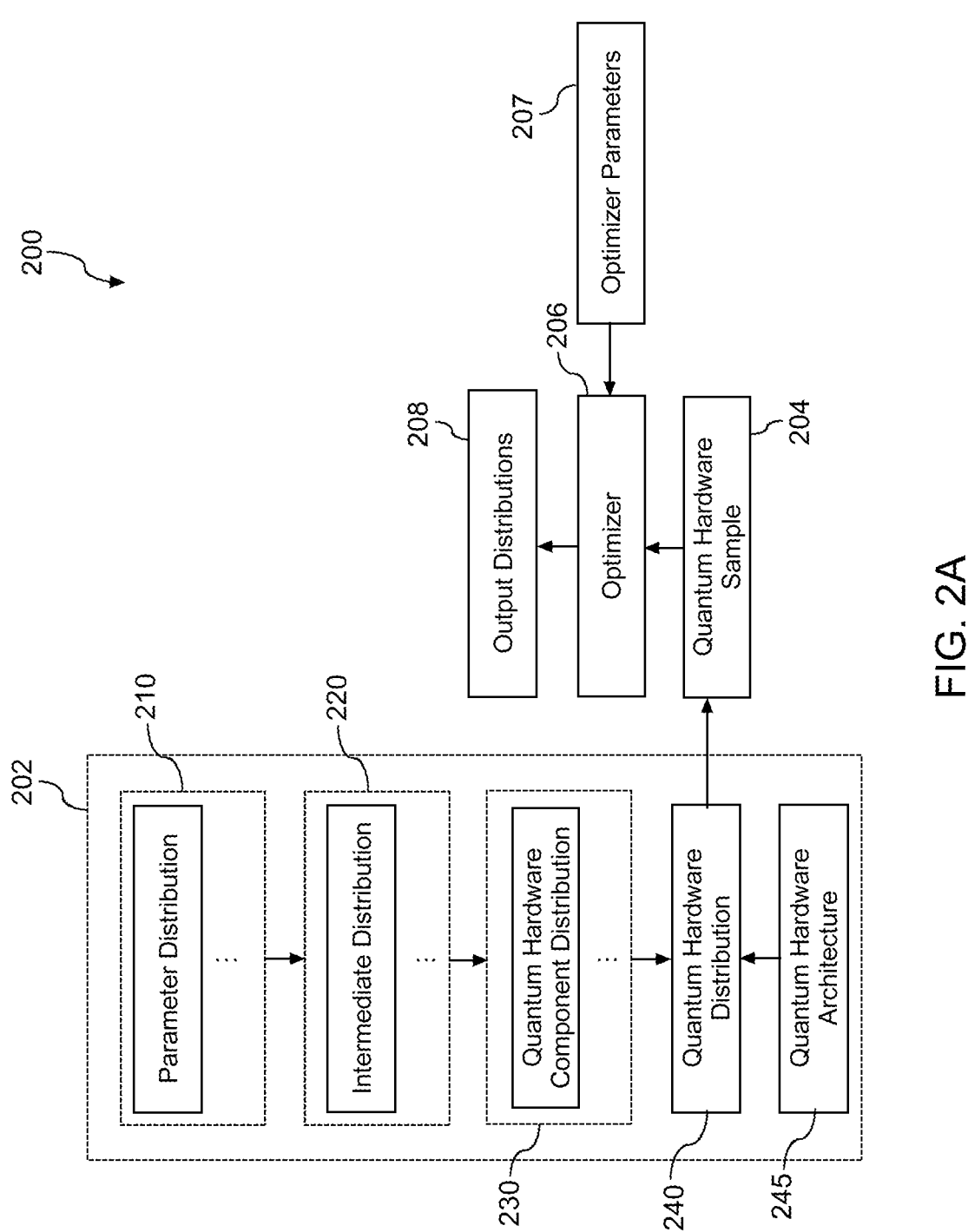
FIG. 2A depicts a block diagram of an example quantum hardware sample generation model according to example embodiments of the present disclosure.
Figure 2B:
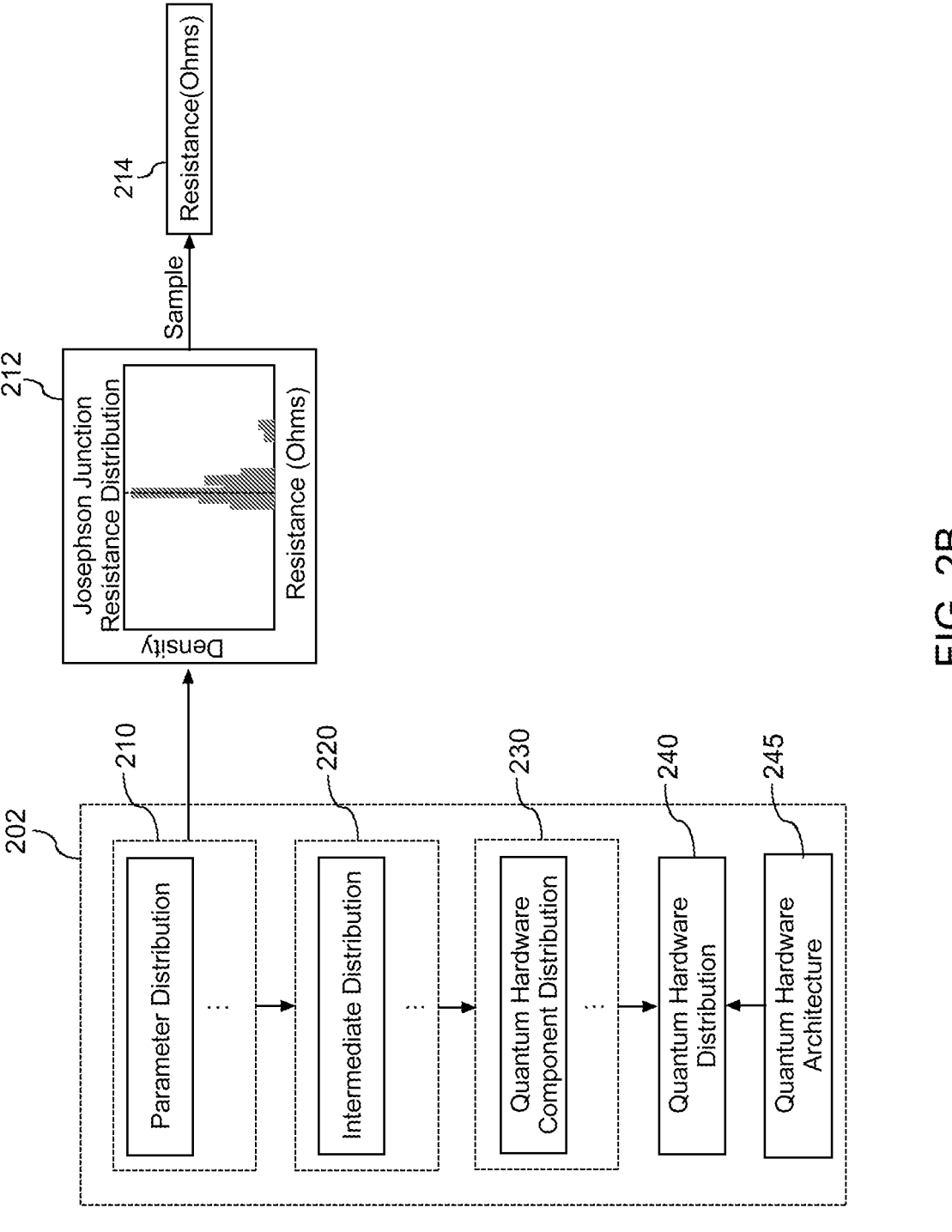
FIG. 2B depicts a block diagram of an example quantum hardware sample generation model according to example embodiments of the present disclosure.

In some implementations, the quantum hardware parameter distributions 210 can be "simple distributions" that return one or more numbers corresponding to some parameter of quantum hardware, such as circuit parameters, fabrication parameters, TLS, etc. For instance, FIG. 2B illustrates an expanded diagram of quantum hardware sample generation system 200 including an example quantum hardware parameter distribution 212. For instance, example quantum hardware parameter distribution 212 can be one example of a distribution of josephson junction resistance for a plurality of quantum hardware instances. The example distribution 212 can be sampled to produce a parameter distribution sample 214. The distribution sample can be propagated through the quantum hardware sample generation model 202 (e.g., by a statistical network, such as through at least intermediate distributions 220). For instance, the example josephson junction resistance distribution of example quantum hardware parameter distribution 212 can be sampled to produce a resistance value in parameter distribution sample 214. The resistance value in parameter distribution sample 214 can be indicative of a josephson junction resistance for an example quantum hardware sample, such as an example quantum hardware sample produced by propagating at least parameter distribution sample 214 through quantum hardware same generation model 202.

In some embodiments, dependencies within quantum hardware sample generation model 202 (e.g., quantum hardware parameter dependencies) can be manually implemented. For instance, dependencies within quantum hardware sample generation model 202 can be established based on understanding of quantum hardware, physics rules, etc. Additionally, quantum hardware parameter distributions 210 having unknown dependencies can be assumed to be independent. For instance, in some embodiments, the quantum hardware parameter dependencies can include one or more conditionally independent relationships between quantum hardware parameter distributions 210 having unknown dependencies and one or more conditionally dependent relationships relating quantum hardware parameter distributions 210 based on known dependencies. In this manner, the quantum hardware sample generation model 202 can define a statistical network, such as a Bayesian network, of quantum hardware parameter distributions 210. Additionally and/or alternatively, in some implementations (e.g., in the presence of sufficient available training data), machine-learned modeling techniques, such as the use of neural networks, can be employed to generate and/or otherwise provide insight on quantum hardware parameter dependencies in quantum hardware sample generation model 202. For example, parameters and/or dependencies of the statistical network can be learned by application of machine-learned modeling and/or training techniques.

In some embodiments, the quantum hardware sample generation model 202 can form a machine-learned quantum hardware sample generation model. For instance, dependencies in the quantum hardware sample generation model 202 (e.g., quantum hardware parameter dependencies) can be learned by a machine-learned model. For instance, the dependencies can be learned based at least in part on training the machine-learned quantum hardware sample generation model. Additionally, the statistical network can be a machine-learned neural network. As one example, a machine-learned model (e.g., a neural network, such as a convolutional neural network, recursive neural network, etc.) can be trained with training data including parameter distributions and/or relationships from existing quantum hardware. The neural network can learn to generate quantum hardware sample generation models 202 in response to being provided with quantum hardware architecture specifications, parameters, etc. at inference time.

Additionally, the quantum hardware sample generation model 202 can include one or more intermediate distributions 220. The intermediate distributions 220 can be more complex than the quantum hardware parameter distributions 210. For instance, the intermediate distributions 220 can combine samples from one or more quantum hardware parameter distributions 210 (and/or one or more other intermediate distributions 220) in a statistically consistent way, such as via one or more statistical networks. The intermediate distributions 220 can be so-called "generalized distributions" which can, in some cases, return more complex objects than parameter distributions 210.

Figure 2C:
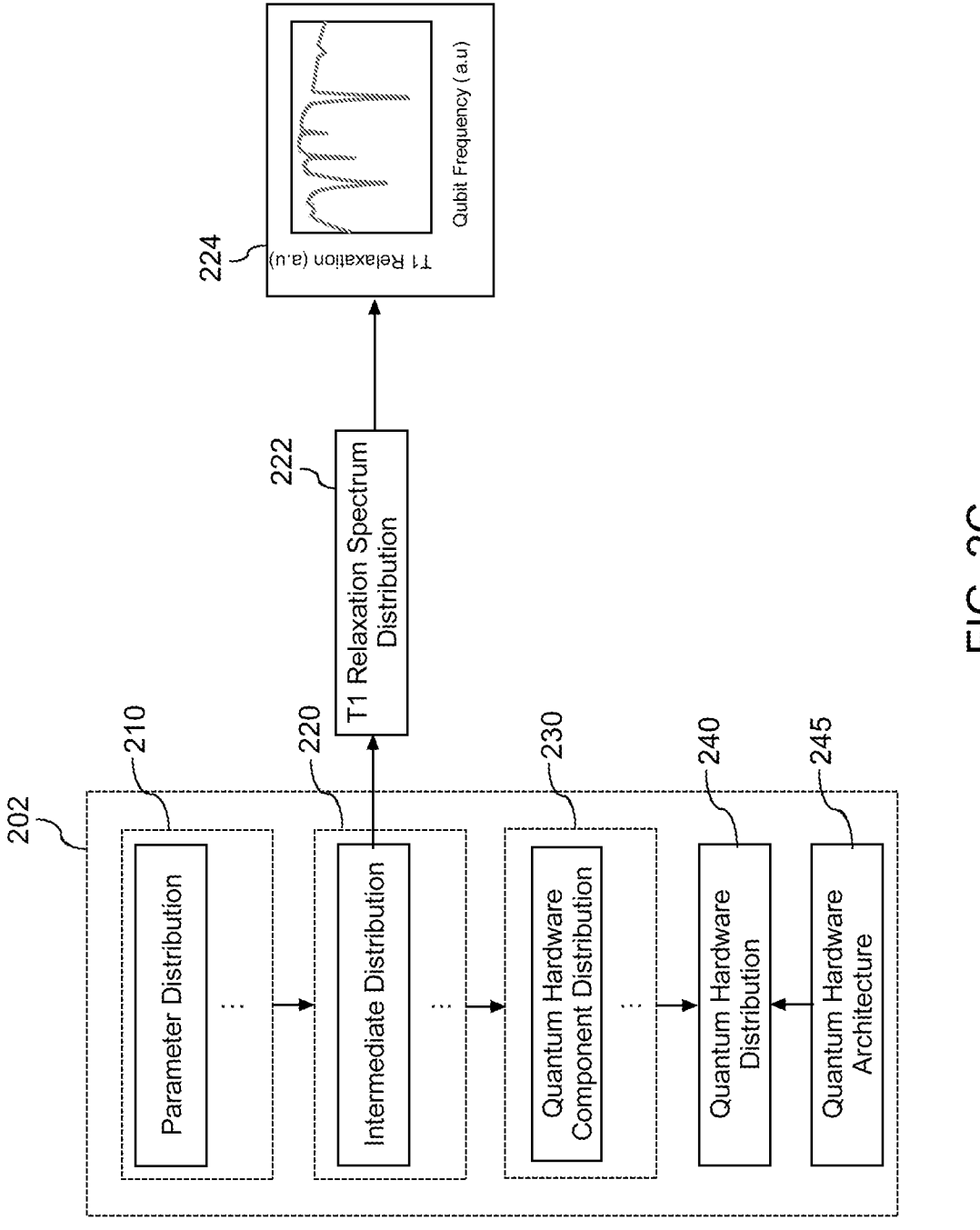
FIG. 2C depicts a block diagram of an example quantum hardware sample generation model according to example embodiments of the present disclosure.

For example, FIG. 2C illustrates an expanded diagram of quantum hardware sample generation system 200 including an example intermediate distribution 222. Example intermediate distribution 222 is an example T1 Relaxation Spectrum Distribution. T1 relaxation can be an important performance metric for qubits. Example intermediate distribution 222 can be sampled to produce intermediate distribution sample 224. For instance, intermediate distribution sample 224 includes a sample of a T1 relaxation spectrum versus the qubit frequency (e.g., an important operating parameter) for one qubit. The relevant underlying parameter distribution samples (e.g., samples from quantum hardware parameter distributions 210) can include, for example, qubit circuit parameters, fabrication parameters, and/or TLS defect parameters.

Additionally, the quantum hardware sample generation model 202 can include one or more quantum hardware component distributions 230. The quantum hardware component distributions 230 can be more complex than the intermediate distributions 220. For instance, the quantum hardware component distributions 230 can combine samples from one or more quantum hardware parameter distributions 210, one or more intermediate distributions 220, and/or one or more other quantum hardware component distributions 230 in a statistically consistent way, such as via one or more statistical networks. A quantum hardware component as represented by quantum hardware component distributions 230 can be a unitary component of quantum hardware, such as, for example, a qubit, a readout resonator, an inter-qubit coupler, and/or other suitable computing elements of quantum hardware, such as a quantum processor.

Figure 2D:
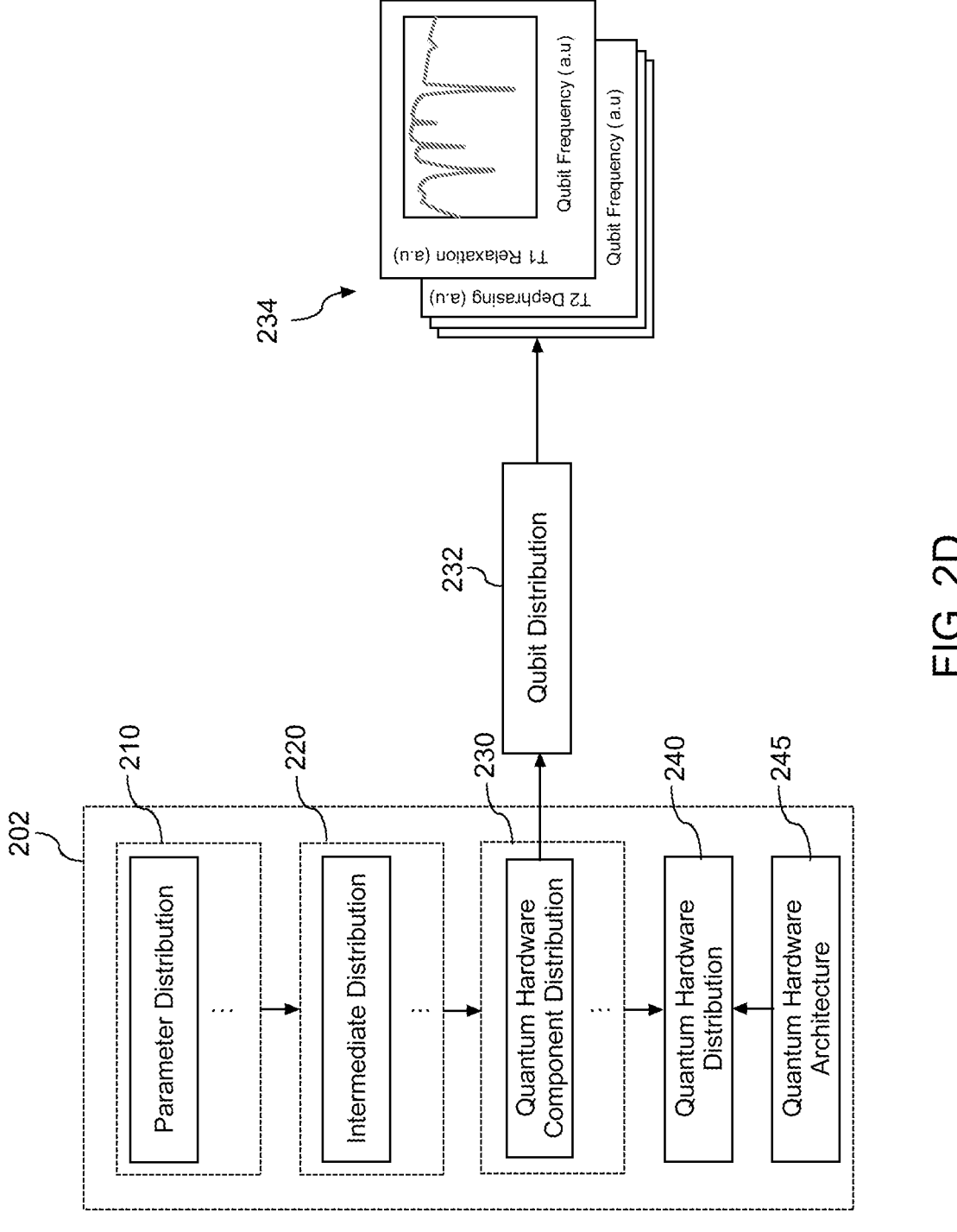
FIG. 2D depicts a block diagram of an example quantum hardware sample generation model according to example embodiments of the present disclosure.

For instance, FIG. 2D illustrates an expanded view of quantum hardware sample generation model 202 including an example quantum hardware component distribution 232. When sampled, the quantum hardware component distributions 230 (e.g., the example quantum hardware component distribution 232) can generate component samples, such as component sample 234. Component sample 234 includes data from which the performance of a respective component according to example quantum hardware component distribution 232 can be estimated. As one example, (e.g., for qubits) the component sample 234 may be or include a T1 relaxation spectrum, a T2 dephasing spectrum, and/or other suitable data.

Additionally, quantum hardware sample generation model 202 can include quantum hardware distribution 240. As one example, quantum hardware distribution 240 can represent an ultimate output of quantum hardware sample generation model 202. Quantum hardware distribution 240 can be sampled to produce a quantum hardware sample 204 in accordance with example aspects of the present disclosure. For example, in some embodiments, the quantum hardware distribution 240, (e.g., including the quantum hardware parameter distributions 210, intermediate distributions 220, quantum hardware components 230, etc.) can be sampled by prior sampling. For example, prior sampling can include the end-to-end procedure of generating a quantum hardware sample 204 from the quantum hardware distribution 240 by sampling the underlying parameter distributions (e.g., 210, 230, 230, etc.) and/or propagating samples through intermediate networks and/or probabilistic relationships characterizing a statistical network of quantum hardware sample generation model 202.

The quantum hardware distribution 240 (e.g., a processor distribution) can be combined with quantum hardware architecture parameters 245 to generate data necessary to estimate the performance of the quantum hardware sample. For instance, the quantum hardware architecture parameters 245 can be or can include a fixed non-probabilistic quantity, such as, for example, processor geometry, qubit type, and other suitable architecture information. A single sample can combine samples from the component distributions 230 for each component in the sample.

Figure 2E:
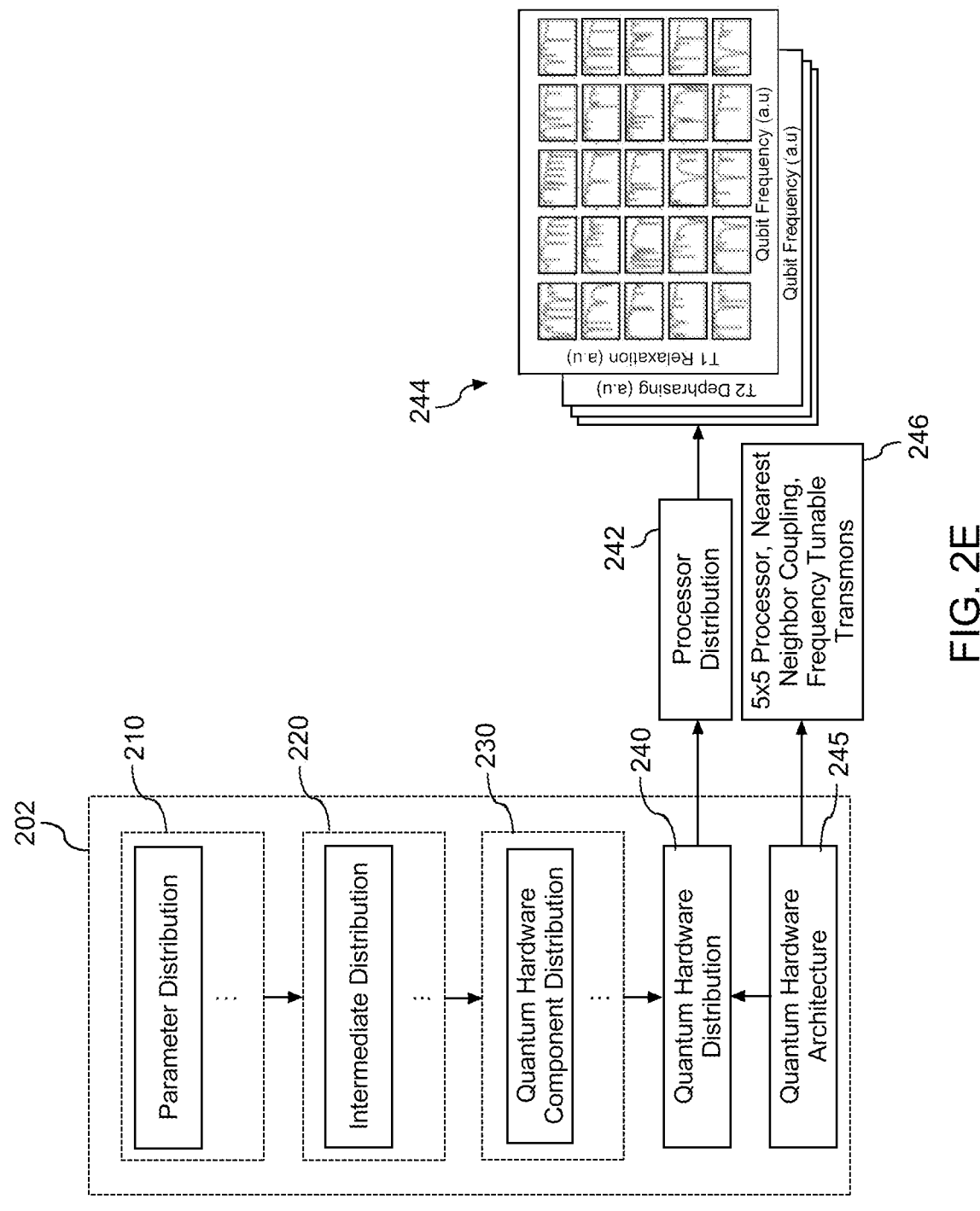
FIG. 2E depicts a block diagram of an example quantum hardware sample generation model according to example embodiments of the present disclosure.

For example, FIG. 2E illustrates an expanded view of quantum hardware sample generation model 202. FIG. 2E illustrates an example processor distribution 242 and example quantum hardware sample 244. Additionally, FIG. 2E illustrates example quantum hardware architecture parameters 246. Example processor distribution 242 can be sampled to produce an example quantum processor sample (e.g., sample 244) with respect to quantum hardware architecture parameters 246. The example depicted in FIG. 2E includes architecture parameters 246 for a 5×5 processor (e.g., having 25 qubits arranged in a 5×5 configuration) having nearest neighbor coupling and/or frequency tunable transmons characteristics. Thus, for example, samples from example processor distribution 242 (e.g., sample 244) will contain 5×5 T1 Relaxation spectra and 5×5 Dephasing Spectra, and other specified relevant information for the specified quantum processor.

The quantum hardware sample 204 sampled from the statistical quantum hardware distribution 240 can be provided to optimizer 206. Optimizer 206 can be configured to provide output distributions 208 (e.g., operating parameters, such as gate frequency) for a quantum hardware sample. The optimizer 206 can operate with respect to optimizer parameters 207 (e.g., parameters that indicate operating constraints of optimizer 206). For instance, optimizer 206 can determine, using an optimization algorithm (e.g., implemented by a computing system), one or more operating parameters (e.g., as part of output distributions 208) that optimize performance of the quantum hardware sample. As one example, the operating parameters can include operating frequency, such as gate frequency (e.g., at one or more qubits). As another example, the one or more simulated performance measurements can be measurements of a performance metric such as, for example, quantum logic gate error, algorithm error (e.g., based on a quantum test algorithm), runtime (e.g., to completion of a quantum test algorithm), etc.

Figure 3:
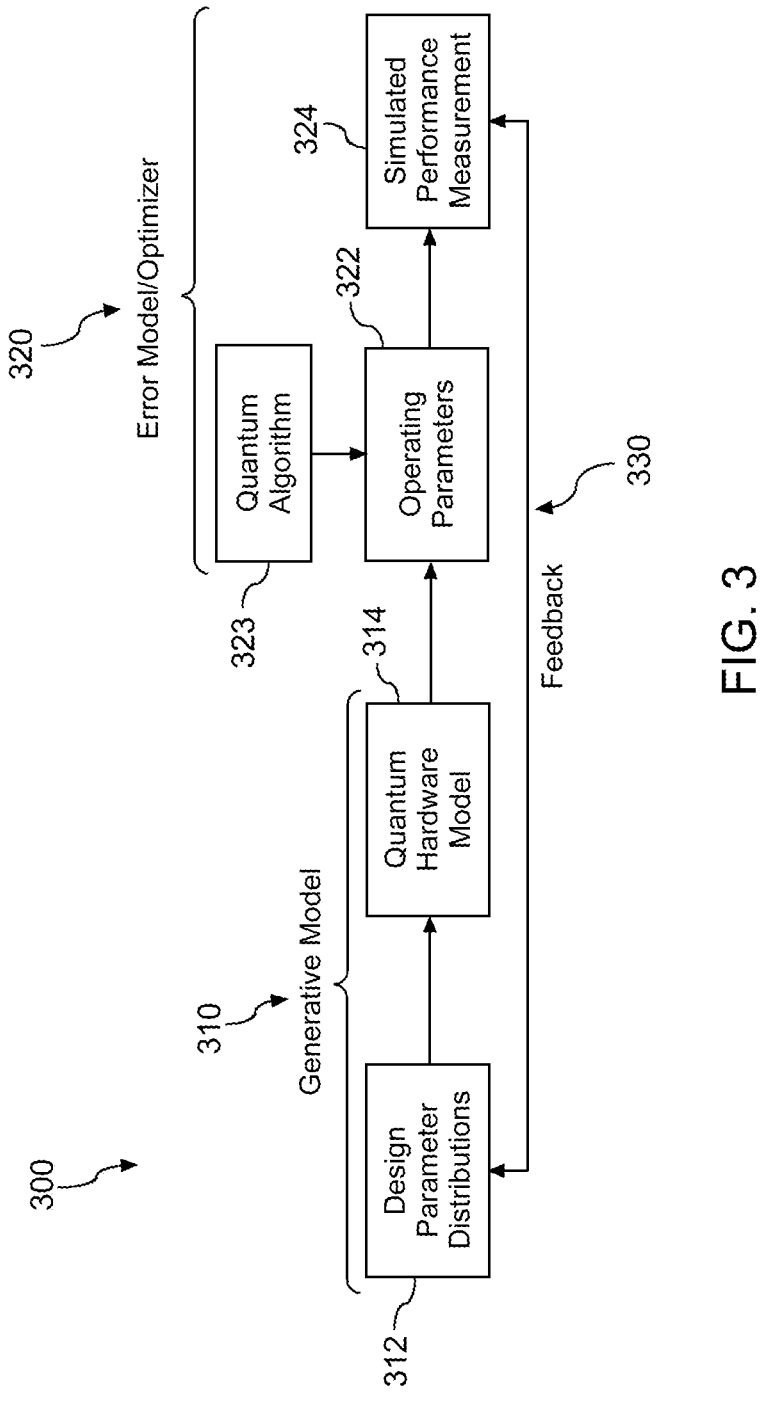
FIG. 3 depicts a flowchart diagram of an example system for quantum hardware design employing an example quantum hardware sample generation model according to example embodiments of the present disclosure.

FIG. 3 depicts a flowchart diagram of an example system 300 for quantum hardware design employing an example quantum hardware sample generation model according to example embodiments of the present disclosure. System 300 can include quantum hardware sample generation model 310. For instance, design parameter distributions 312 (e.g., quantum hardware parameter distributions) can be provided to quantum hardware sample generation model 310 to produce quantum hardware sample 314. System 300 can additionally include optimizer 320. Optimizer 320 can receive quantum hardware sample 314 and determine operating parameters 322 (e.g., operating frequency) with respect to a quantum test algorithm 323. The optimizer 320 can then produce simulated performance measurement 324 (e.g., gate error, algorithm error, etc.). Simulated performance measurement 324 can be propagated through feedback loop 330 to adjust the design parameter distributions 312. For instance, the system 300 can implement a control action (e.g., from a user and/or automatically) to adjust the design parameter distributions to optimize (e.g., reduce/minimize error of) simulated performance measurement 324.

Figure 4:
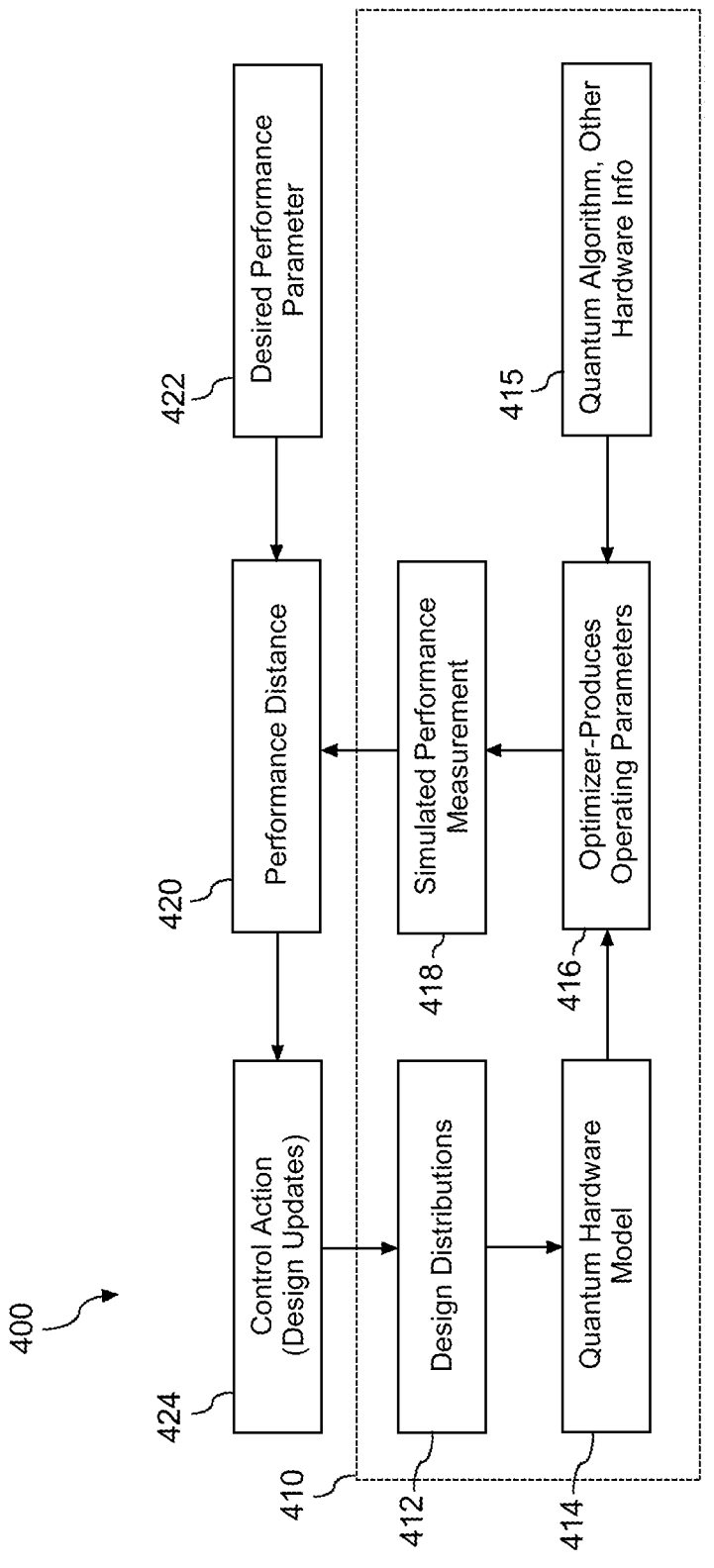
FIG. 4 depicts a flowchart diagram of an example system for quantum hardware design employing an example quantum hardware sample generation model according to example embodiments of the present disclosure.

FIG. 4 depicts a flowchart diagram of an example system 400 for quantum hardware design employing an example quantum hardware sample generation model according to example embodiments of the present disclosure. System 400 can include quantum hardware sample generation model 410. For instance, design parameter distributions 412 (e.g., quantum hardware parameter distributions) can be provided to quantum hardware sample generation model 410 to produce quantum hardware sample 414.

System 400 can additionally include optimizer 416. Optimizer 416 can receive quantum hardware sample 314 and determine operating parameters (e.g., operating frequency) with respect to a quantum test algorithm 415. The optimizer 416 can then determine simulated performance measurement 418 (e.g., algorithm error). As one example, determining the simulated performance measurements 418 can include providing the quantum hardware sample 414 to a quantum circuit simulator system (e.g., as part of optimizer 416) and obtaining, from the quantum circuit simulator system, the simulated performance measurements 418 (e.g., algorithm error) with respect to one or more test algorithms 415. For instance, the quantum circuit simulator system can be configured to simulate performance of the quantum hardware sample 414 with respect to one or more test algorithms 415. The test algorithms 415 can be quantum algorithms used to test performance of the quantum hardware sample. For instance, the test algorithms 415 can include sequence(s) of one or more quantum gate operations, such as, for example, Pauli gates (e.g., Pauli-X gates, Pauli-Y gates, and/or Pauli-Z gates), Hadamard gates, phase gates, T gates, controlled not (CNOT) gates, controlled Z (CZ) gates, SWAP gates, Toffoli gates, and/or any other suitable quantum gates, or combination thereof. The simulated performance errors 418 can include algorithm errors that are representative of how accurately the quantum hardware sample 414 can perform the test algorithms 415. For example, missed or incorrect operations, inaccuracies, etc. can increase an algorithm error.

Additionally, the system 400 can obtain one or more performance distances 420 between the one or more simulated performance measurements 418 and one or more target performance measurements 422. As one example, the performance distances 420 can be obtained by subtracting a simulated performance measurement 418 (e.g., a measurement of an operating parameter, algorithm error, etc.) from a corresponding target performance measurement 422. For example, in some cases, the simulated performance measurements 418 and/or target performance measurements 422 can be or can include simple numbers upon which arithmetic subtraction can be performed. Additionally and/or alternatively, in some cases, the simulated performance measurements 418 and/or target performance measurements 422 can be or can include distributions. In cases including distributions, the performance distances 420 can be obtained by suitable analogous processes, such as, for example, computing a statistical distance metric, such as cross-entropy or KL-divergence. The performance distances 420 can generally be indicative of how closely a quantum hardware sample performs to a target specification, such as a design requirement. In some embodiments, the target performance measurements 422 can include a distribution and/or a threshold.

Based on the performance distances 420, the system 400 can implement a control action 424 to adjust at least one of the one or more quantum hardware parameter distributions 412. For instance, in some embodiments, the control action 424 can be implemented to adjust the quantum hardware parameter distributions 412 as part of a feedback loop to optimize design of the quantum hardware parameter distributions 412. As one example, the control action 424 can include incrementing, decrementing, shifting, stretching, replacing, changing distribution type of, or performing any other suitable control action on at least one of the one or more quantum hardware parameter distributions 412.

The control action 424 can be implemented to lessen and/or eventually minimize the performance distance(s) 420. For instance, in some embodiments, the simulated performance measurements 418, performance distance 420, and/or other data from the quantum hardware sample generation model 410 can be provided to a user. The user can provide control action 424 to the computing system that is implemented to adjust the quantum hardware parameter distributions 412. For instance, a user can manually perform operations on a quantum hardware parameter distribution 412, such as incrementing, decrementing, shifting, stretching, replacing, changing distribution type, etc. Additionally and/or alternatively, the control action 424 can be propagated from the one or more performance distances 420. For example, the control action 424 can be determined by a feedback loop (e.g., by a gradient, such as by gradient descent).

FIG. 5 depicts a flowchart diagram of an example computer-implemented method 500 for simulating quantum hardware performance according to example embodiments of the present disclosure. Although FIG. 5 depicts steps performed in a particular order for purposes of illustration and discussion, the methods of the present disclosure are not limited to the particularly illustrated order or arrangement. The various steps of the method 500 can be omitted, rearranged, combined, and/or adapted in various ways without deviating from the scope of the present disclosure.

At 502, the method 500 can include accessing (e.g., by a computing system including one or more computing devices) a quantum hardware sample generation model configured to generate quantum hardware samples. The quantum hardware sample generation model can include one or more quantum hardware parameter distributions. For instance, the quantum hardware sample generation model can be or include any of the quantum hardware sample generation models discussed with reference to FIGS. 2 through 4.

As one example, the quantum hardware sample generation model can include one or more quantum hardware parameter distribution and/or one or more quantum hardware parameter dependencies defining relationships between the one or more quantum hardware parameter distributions. The one or more quantum hardware parameter distributions and one or more quantum hardware parameter dependencies can define a statistical (e.g., Bayesian network including a hardware distribution that, when sampled, produces a quantum hardware sample that is configured to model behavior of quantum hardware. As one example, the quantum hardware parameter distributions can form nodes of the statistical network and/or the quantum hardware parameter dependencies can form edges of the statistical network. Samples from some or all of the nodes (e.g., the quantum hardware parameter distributions) can be propagated through the statistical network by the edges (e.g., the quantum hardware parameter dependencies) to an ultimate output (e.g., the hardware distribution) that, when sampled, produced a quantum hardware sample. The quantum hardware parameter distributions and/or quantum hardware parameter dependencies can be formed by empirical measurement, prior understanding of the quantum hardware (e.g., physics rules), and/or from theoretical data (e.g., desired design parameters, assumptions, etc.).

At 504, the method 500 can include sampling (e.g., by the computing system) a quantum hardware sample from the quantum hardware sample generation model. For instance, in some embodiments, sampling the quantum hardware sample from the quantum hardware sample generation model can include sampling one or more parameter samples from each of the one or more quantum hardware parameter distributions and propagating the one or more parameter samples through the statistical network based on the one or more quantum hardware parameter dependencies. For instance, in some embodiments, sampling the one or more parameter samples can include prior sampling the one or more parameter samples. As an example, each of a plurality of quantum hardware parameter distributions can be sampled (e.g., by prior sampling) and propagated through the statistical (e.g., Bayesian) network based on their dependencies. For instance, an ultimate output of the statistical network (e.g., a hardware distribution node) can be sampled (e.g., by prior sampling) to produce the quantum hardware sample.

At 506, the computer-implemented method 500 can include obtaining (e.g., by the computing system) one or more simulated performance measurements from the quantum hardware sample. For instance, in some embodiments, obtaining the one or more simulated performance measurements can include determining, using an optimization algorithm (e.g., implemented by the computing system), one or more operating parameters and simulating (e.g., by the computing system), the one or more simulated performance measurements based at least in part on the one or more operating parameters. As one example, the operating parameters can include operating frequency, such as gate frequency (e.g., at one or more qubits). As another example, the one or more simulated performance measurements can be measurements of a performance metric such as, for example, algorithm error, runtime, etc.

As one example, obtaining the one or more simulated performance measurements can include providing (e.g., by the computing system) the quantum hardware sample to a quantum circuit simulator system and obtaining, by the computing system and from the quantum circuit simulator system, one or more algorithm errors with respect to the one or more test algorithms. For instance, the quantum circuit simulator system can be configured to simulate performance of the quantum hardware sample with respect to one or more test algorithms. The test algorithms can be quantum algorithms used to test performance of the quantum hardware sample. For instance, the test algorithms can include sequence(s) of one or more quantum gate operations, such as, for example, Pauli gates (e.g., Pauli-X gates, Pauli-Y gates, and/or Pauli-Z gates), Hadamard gates, phase gates, T gates, controlled not (CNOT) gates, controlled Z (CZ) gates, SWAP gates, Toffoli gates, and/or any other suitable quantum gates, or combination thereof. The algorithm errors can be representative of how accurately the quantum hardware sample can perform the test algorithms. For example, missed or incorrect operations, inaccuracies, etc. can increase an algorithm error. The algorithm error can be an example of a simulated performance measurement.

At 508, the computer-implemented method 500 can include obtaining (e.g., by the computing system) one or more performance distances between the one or more simulated performance measurements and one or more target performance measurements. As one example, the performance distances can be obtained by subtracting a simulated performance measurement (e.g., a measurement of an operating parameter, algorithm error, etc.) from a corresponding target performance measurement. The performance distances can generally be indicative of how closely a quantum hardware sample performs to a target specification, such as a design requirement.

At 510, the computer-implemented method 500 can include implementing (e.g., by the computing system) a control action to adjust at least one of the one or more quantum hardware parameter distributions based at least in part on the one or more performance distances. For instance, in some embodiments, the control action can adjust the quantum hardware parameter distributions as part of a feedback loop to optimize design of the quantum hardware parameter distributions. As one example, the control action can include incrementing, decrementing, shifting, stretching, replacing, changing distribution type of, or performing any other suitable control action on at least one of the one or more quantum hardware parameter distributions.

The control action can be implemented to lessen and/or eventually minimize the performance distance(s). For instance, in some embodiments, the simulated performance measurements, performance distance, and/or other data from the quantum hardware sample generation model can be provided to a user. The user can provide a control action to the computing system that is implemented to adjust the quantum hardware parameter distributions. For instance, a user can manually perform operations on a quantum hardware parameter distribution, such as incrementing, decrementing, shifting, stretching, replacing, changing distribution type, etc. Additionally and/or alternatively, the control action can be propagated from the one or more performance distances. For example, the control action can be determined by a feedback loop (e.g., by a gradient, such as by gradient descent).

FIG. 6 depicts a flowchart diagram of an example computer-implemented method 600 for generating quantum hardware samples simulating performance of quantum hardware according to example embodiments of the present disclosure. Although FIG. 6 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

At 602, the computer-implemented method 600 can include accessing (e.g., by a computing system including one or more computing devices), a quantum hardware sample generation model configured to generate quantum hardware samples. The quantum hardware sample generation model can include a statistical network of one or more quantum hardware parameter distributions and one or more quantum hardware parameter dependencies. For instance, the quantum hardware sample generation model can be or include any of the quantum hardware sample generation models discussed with reference to FIGS. 2 through 4.

As one example, the quantum hardware sample generation model can include one or more quantum hardware parameter distribution and/or one or more quantum hardware parameter dependencies defining relationships between the one or more quantum hardware parameter distributions. The one or more quantum hardware parameter distributions and one or more quantum hardware parameter dependencies can define a statistical (e.g., Bayesian network including a hardware distribution that, when sampled, produces a quantum hardware sample that is configured to model behavior of quantum hardware. As one example, the quantum hardware parameter distributions can form nodes of the statistical network and/or the quantum hardware parameter dependencies can form edges of the statistical network. Samples from some or all of the nodes (e.g., the quantum hardware parameter distributions) can be propagated through the statistical network by the edges (e.g., the quantum hardware parameter dependencies) to an ultimate output (e.g., the hardware distribution) that, when sampled, produced a quantum hardware sample. The quantum hardware parameter distributions and/or quantum hardware parameter dependencies can be formed by empirical measurement, prior understanding of the quantum hardware (e.g., physics rules), and/or from theoretical data (e.g., desired design parameters, assumptions, etc.). The quantum hardware sample can include a plurality of mathematical models (e.g., parameters, functions, etc.) that model behavior of a plurality of performance metrics of quantum hardware with respect to one or more operating parameters.

At 604, the computer-implemented method 600 can include sampling (e.g., by the computing system) the quantum hardware sample generation model to obtain a quantum hardware sample. Sampling the quantum hardware sample generation model can include sampling one or more parameter samples from each of the one or more quantum hardware parameter distributions and propagating the one or more parameter samples through the statistical network based on the one or more quantum hardware parameter dependencies. For example, the parameter samples can be or can include a single entity, instance, etc. sampled from the quantum hardware parameter distributions. As one example, if the quantum hardware parameter distribution is a distribution of a resistance, the parameter sample can be a resistance value.

Figure 7A:
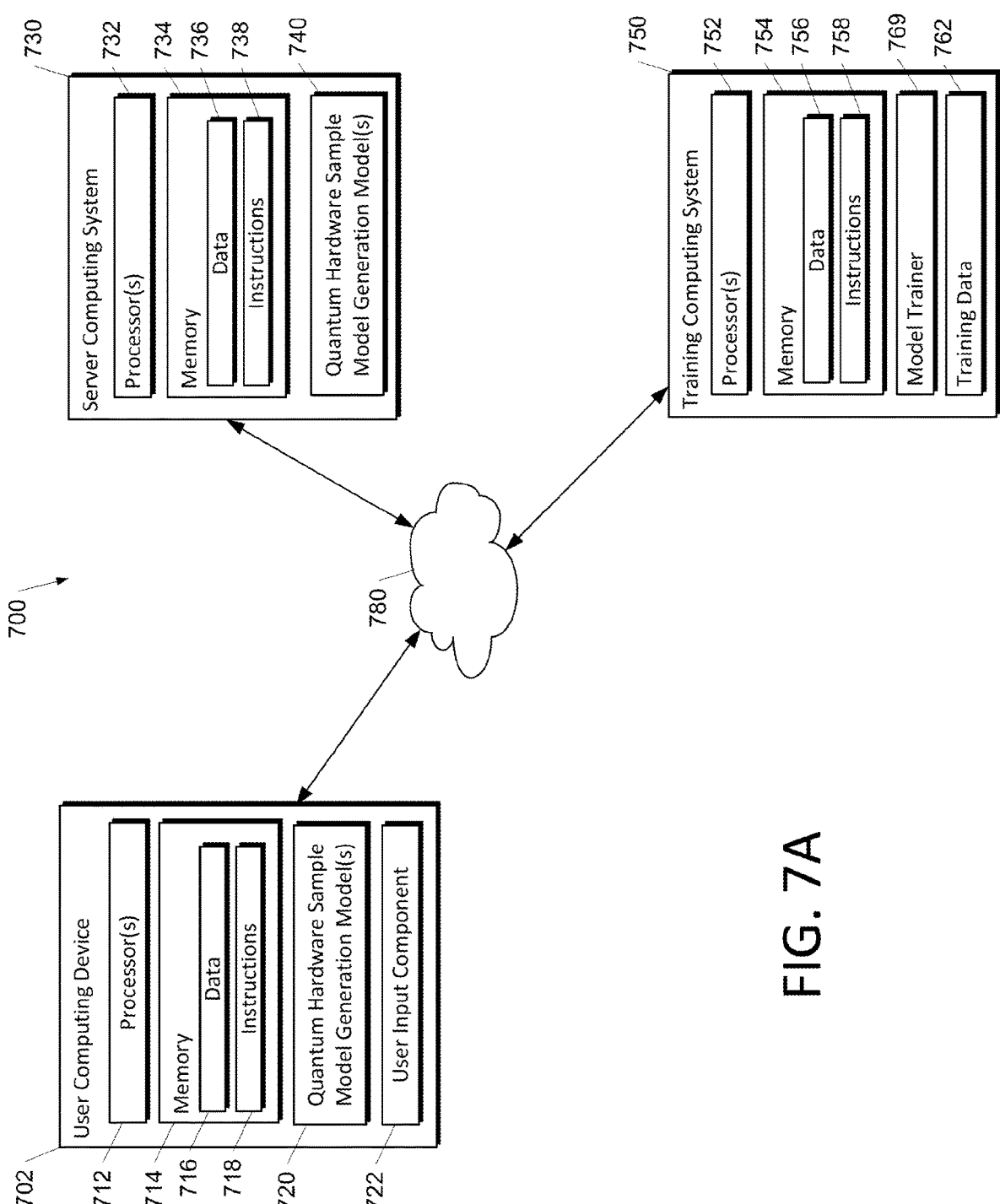
FIG. 7A depicts a block diagram of an example computing system that performs quantum hardware sample model generation according to example embodiments of the present disclosure.

FIG. 7A depicts a block diagram of an example computing system 700 that performs quantum hardware sample model generation according to example embodiments of the present disclosure. The system 700 includes a user computing device 702, a server computing system 730, and a training computing system 750 that are communicatively coupled over a network 780.

The user computing device 702 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 702 includes one or more processors 712 and a memory 714. The one or more processors 712 can be any suitable processing device (e.g., a processor core, a microprocessor, an ASIC, a FPGA, a controller, a microcontroller, etc.) and can be one processor or a plurality of processors that are operatively connected. The memory 714 can include one or more non-transitory computer-readable storage mediums, such as RAM, ROM, EEPROM, EPROM, flash memory devices, magnetic disks, etc., and combinations thereof. The memory 714 can store data 716 and instructions 718 which are executed by the processor 712 to cause the user computing device 702 to perform operations.

In some implementations, the user computing device 702 can store or include one or more quantum hardware sample model generation models 720. For example, the quantum hardware sample model generation models 720 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks.

In some implementations, the one or more quantum hardware sample model generation models 720 can be received from the server computing system 730 over network 780, stored in the user computing device memory 714, and then used or otherwise implemented by the one or more processors 712. In some implementations, the user computing device 702 can implement multiple parallel instances of a single quantum hardware sample model generation model 720 (e.g., to perform parallel quantum hardware sample model generation across multiple instances of quantum hardware sample model generation models).

Additionally or alternatively, one or more quantum hardware sample model generation models 740 can be included in or otherwise stored and implemented by the server computing system 730 that communicates with the user computing device 702 according to a client-server relationship. For example, the quantum hardware sample model generation models 740 can be implemented by the server computing system 740 as a portion of a web service (e.g., a quantum hardware sample model generation service). Thus, one or more models 720 can be stored and implemented at the user computing device 702 and/or one or more models 740 can be stored and implemented at the server computing system 730.

The user computing device 702 can also include one or more user input component 722 that receives user input. For example, the user input component 722 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 730 includes one or more processors 732 and a memory 734. The one or more processors 732 can be any suitable processing device (e.g., a processor core, a microprocessor, an ASIC, a FPGA, a controller, a microcontroller, etc.) and can be one processor or a plurality of processors that are operatively connected. The memory 734 can include one or more non-transitory computer-readable storage mediums, such as RAM, ROM, EEPROM, EPROM, flash memory devices, magnetic disks, etc., and combinations thereof. The memory 734 can store data 736 and instructions 738 which are executed by the processor 732 to cause the server computing system 730 to perform operations.

In some implementations, the server computing system 730 includes or is otherwise implemented by one or more server computing devices. In instances in which the server computing system 730 includes plural server computing devices, such server computing devices can operate according to sequential computing architectures, parallel computing architectures, or some combination thereof.

As described above, the server computing system 730 can store or otherwise include one or more machine-learned quantum hardware sample model generation models 740. For example, the models 740 can be or can otherwise include various machine-learned models. Example machine-learned models include neural networks or other multi-layer non-linear models. Example neural networks include feed forward neural networks, deep neural networks, recurrent neural networks, and convolutional neural networks.

The user computing device 702 and/or the server computing system 730 can train the models 720 and/or 740 via interaction with the training computing system 750 that is communicatively coupled over the network 780. The training computing system 750 can be separate from the server computing system 730 or can be a portion of the server computing system 730.

The training computing system 750 includes one or more processors 752 and a memory 754. The one or more processors 752 can be any suitable processing device (e.g., a processor core, a microprocessor, an ASIC, a FPGA, a controller, a microcontroller, etc.) and can be one processor or a plurality of processors that are operatively connected. The memory 754 can include one or more non-transitory computer-readable storage mediums, such as RAM, ROM, EEPROM, EPROM, flash memory devices, magnetic disks, etc., and combinations thereof. The memory 754 can store data 756 and instructions 758 which are executed by the processor 752 to cause the training computing system 750 to perform operations. In some implementations, the training computing system 750 includes or is otherwise implemented by one or more server computing devices.

The training computing system 750 can include a model trainer 760 that trains the machine-learned models 720 and/or 740 stored at the user computing device 702 and/or the server computing system 730 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 760 can perform a number of generalization techniques (e.g., weight decays, dropouts, etc.) to improve the generalization capability of the models being trained.

In particular, the model trainer 760 can train the quantum hardware sample model generation models 720 and/or 740 based on a set of training data 762. The training data 762 can include, for example, quantum hardware parameter distributions, quantum hardware parameter dependencies, and/or other sampled performance metrics from actual quantum hardware.

In some implementations, if the user has provided consent, the training examples can be provided by the user computing device 702. Thus, in such implementations, the model 720 provided to the user computing device 702 can be trained by the training computing system 750 on user-specific data received from the user computing device 702. In some instances, this process can be referred to as personalizing the model.

The model trainer 760 includes computer logic utilized to provide desired functionality. The model trainer 760 can be implemented in hardware, firmware, and/or software controlling a general purpose processor. For example, in some implementations, the model trainer 760 includes program files stored on a storage device, loaded into a memory and executed by one or more processors. In other implementations, the model trainer 760 includes one or more sets of computer-executable instructions that are stored in a tangible computer-readable storage medium such as RAM hard disk or optical or magnetic media.

The network 780 can be any type of communications network, such as a local area network (e.g., intranet), wide area network (e.g., Internet), or some combination thereof and can include any number of wired or wireless links. In general, communication over the network 780 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the machine-learned model(s) can be configured to perform a task that includes encoding input data for reliable and/or efficient transmission or storage (and/or corresponding decoding). For example, the task may be an audio compression task. The input may include audio data and the output may comprise compressed audio data. In another example, the input includes visual data (e.g. one or more images or videos), the output comprises compressed visual data, and the task is a visual data compression task. In another example, the task may comprise generating an embedding for input data (e.g. input audio or visual data).

FIG. 7A illustrates one example computing system that can be used to implement the present disclosure. Other computing systems can be used as well. For example, in some implementations, the user computing device 702 can include the model trainer 760 and the training dataset 762. In such implementations, the models 720 can be both trained and used locally at the user computing device 702. In some of such implementations, the user computing device 702 can implement the model trainer 760 to personalize the models 720 based on user-specific data.

Figure 7B:
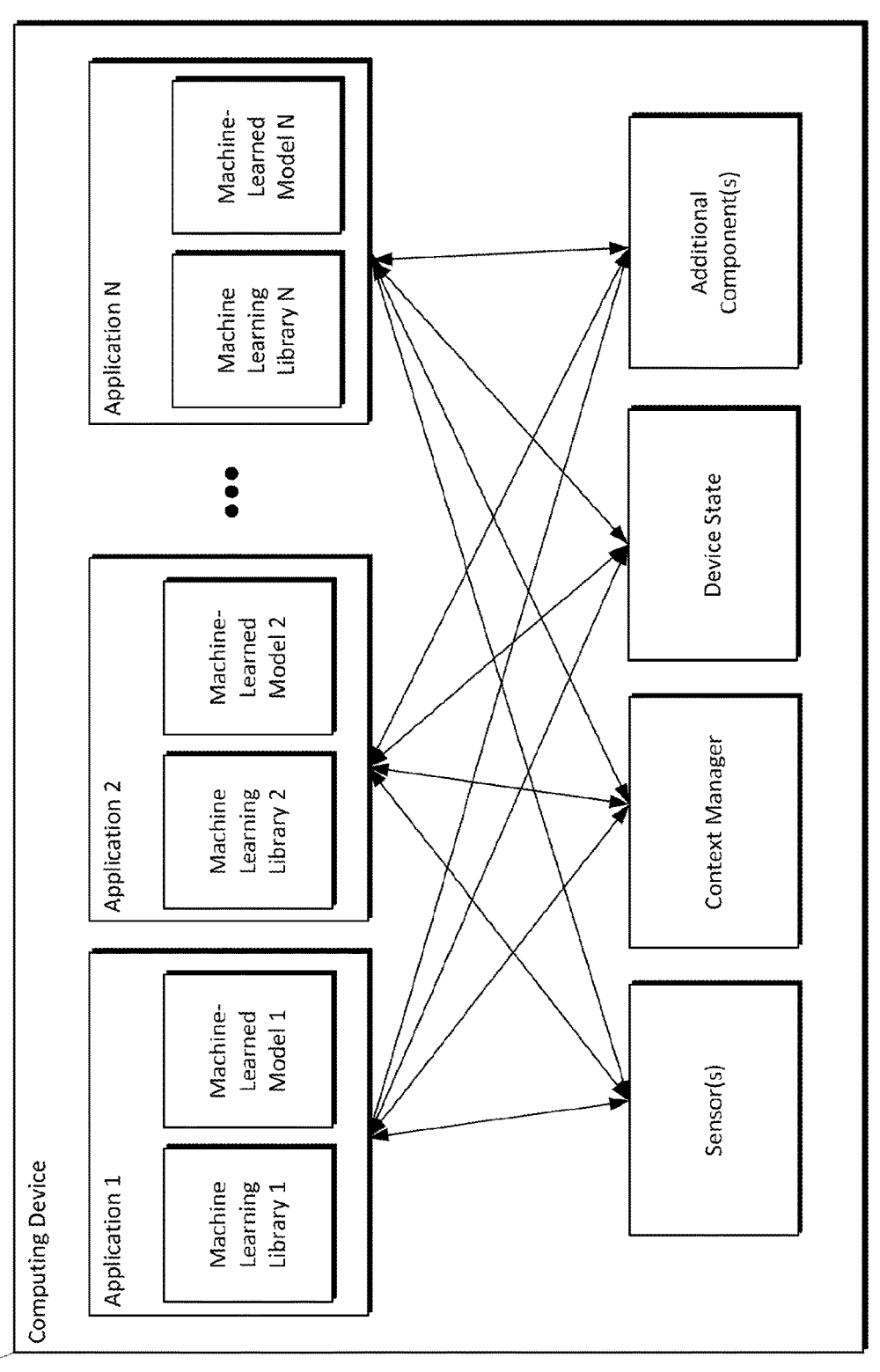
FIG. 7B depicts a block diagram of an example computing device that performs quantum hardware sample model generation according to example embodiments of the present disclosure.

FIG. 7B depicts a block diagram of an example computing device 10 that performs quantum hardware sample model generation according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 7B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 7C:
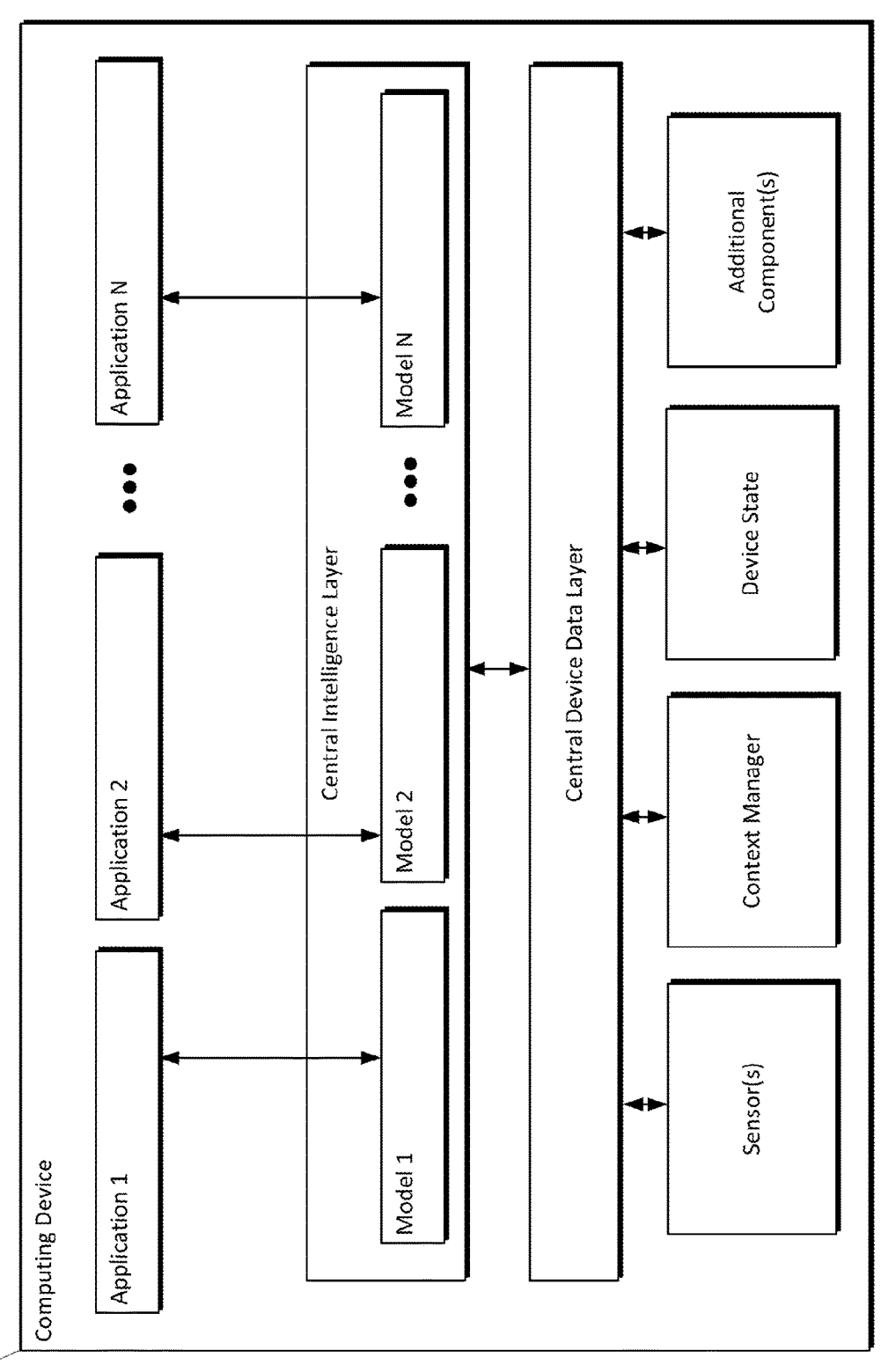
FIG. 7C depicts a block diagram of an example computing device that performs quantum hardware sample model generation according to example embodiments of the present disclosure.

FIG. 7C depicts a block diagram of an example computing device 50 that performs quantum hardware sample model generation according to example embodiments of the present disclosure. The computing device 50 can be a user computing device or a server computing device.

The computing device 50 includes a number of applications (e.g., applications 7 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 7C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 7C, the central device data layer can communicate with a number of other components of the computing device, such as, for example, one or more sensors, a context manager, a device state component, and/or additional components. In some implementations, the central device data layer can communicate with each device component using an API (e.g., a private API).

Implementations of the digital, classical, and/or quantum subject matter and the digital functional operations and quantum operations described in this specification can be implemented in digital electronic circuitry, suitable quantum circuitry or, more generally, quantum computational systems, in tangibly-implemented digital and/or quantum computer software or firmware, in digital and/or quantum computer hardware, including the structures disclosed in this specification and their structural equivalents, or in combinations of one or more of them. The term "quantum computing systems" may include, but is not limited to, quantum computers/computing systems, quantum information processing systems, quantum cryptography systems, or quantum simulators.

Implementations of the digital and/or quantum subject matter described in this specification can be implemented as one or more digital and/or quantum computer programs, i.e., one or more modules of digital and/or quantum computer program instructions encoded on a tangible non-transitory storage medium for execution by, or to control the operation of, data processing apparatus. The digital and/or quantum computer storage medium can be a machine-readable storage device, a machine-readable storage substrate, a random or serial access memory device, one or more qubits/qubit structures, or a combination of one or more of them. Alternatively or in addition, the program instructions can be encoded on an artificially-generated propagated signal that is capable of encoding digital and/or quantum information (e.g., a machine-generated electrical, optical, or electromagnetic signal) that is generated to encode digital and/or quantum information for transmission to suitable receiver apparatus for execution by a data processing apparatus.

The terms quantum information and quantum data refer to information or data that is carried by, held, or stored in quantum systems, where the smallest non-trivial system is a qubit, i.e., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states (e.g., qudits) are possible.

The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, or multiple digital and quantum processors or computers, and combinations thereof. The apparatus can also be, or further include, special purpose logic circuitry, e.g., an FPGA (field programmable gate array), or an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital or classical computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL, Quipper, Cirq, etc.

A digital and/or quantum computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A digital and/or quantum computer program can be deployed to be executed on one digital or one quantum computer or on multiple digital and/or quantum computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable digital and/or quantum computers, operating with one or more digital and/or quantum processors, as appropriate, executing one or more digital and/or quantum computer programs to perform functions by operating on input digital and quantum data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more digital and/or quantum computers or processors to be "configured to" or "operable to" perform particular operations or actions means that the system has installed on it software, firmware, hardware, or a combination of them that in operation cause the system to perform the operations or actions. For one or more digital and/or quantum computer programs to be configured to perform particular operations or actions means that the one or more programs include instructions that, when executed by digital and/or quantum data processing apparatus, cause the apparatus to perform the operations or actions. A quantum computer may receive instructions from a digital computer that, when executed by the quantum computing apparatus, cause the apparatus to perform the operations or actions.

Digital and/or quantum computers suitable for the execution of a digital and/or quantum computer program can be based on general or special purpose digital and/or quantum microprocessors or both, or any other kind of central digital and/or quantum processing unit. Generally, a central digital and/or quantum processing unit will receive instructions and digital and/or quantum data from a read-only memory, or a random access memory, or quantum systems suitable for transmitting quantum data, e.g. photons, or combinations thereof.

Some example elements of a digital and/or quantum computer are a central processing unit for performing or executing instructions and one or more memory devices for storing instructions and digital and/or quantum data. The central processing unit and the memory can be supplemented by, or incorporated in, special purpose logic circuitry or quantum simulators. Generally, a digital and/or quantum computer will also include, or be operatively coupled to receive digital and/or quantum data from or transfer digital and/or quantum data to, or both, one or more mass storage devices for storing digital and/or quantum data, e.g., magnetic, magneto-optical disks, or optical disks, or quantum systems suitable for storing quantum information. However, a digital and/or quantum computer need not have such devices.

Digital and/or quantum computer-readable media suitable for storing digital and/or quantum computer program instructions and digital and/or quantum data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a digital and/or quantum computer program product that includes instructions that are stored on one or more tangible, non-transitory machine-readable storage media, and that are executable on one or more digital and/or quantum processing devices. The systems described in this specification, or portions of them, can each be implemented as an apparatus, method, or electronic system that may include one or more digital and/or quantum processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computing system, the computing system comprising:

one or more processors; and one or more memory devices, the one or more memory devices storing computer-readable data defining a quantum hardware sample generation model and instructions that, when implemented, cause the quantum hardware sample generation model to provide a quantum hardware sample;

wherein the quantum hardware sample generation model comprises:

one or more quantum hardware parameter distributions;

one or more quantum hardware parameter dependencies defining relationships between the one or more quantum hardware parameter distributions;

wherein the one or more quantum hardware parameter distributions and one or more quantum hardware parameter dependencies define a statistical network including a hardware distribution that, when sampled, produces a quantum hardware sample, the quantum hardware sample configured to model a performance of fabricated quantum hardware, wherein the model is subsequently employed to fabricate the physical quantum processor.

2. The computing system of claim 1, wherein the statistical network comprises a Bayesian network.

3. The computing system of claim 1, wherein the one or more quantum hardware parameter distributions comprise one or more empirically measured quantum hardware parameter distributions.

4. The computing system of claim 1, wherein the one or more quantum hardware parameter distributions comprise one or more designed quantum hardware parameter distributions.

5. The computing system of claim 1, wherein the one or more quantum hardware parameter distributions comprise at least one of one or more circuit parameters, one or more electrical parameters, or one or more defect parameters.

6. The computing system of claim 1, wherein the one or more quantum hardware parameter distributions comprise at least one of a qubit distribution, qubit circuit distribution, qubit relaxation distribution, or background loss distribution.

7. The computing system of claim 1, wherein the quantum hardware comprises a quantum processor comprising one or more qubits.

8. The computing system of claim 1, wherein the quantum hardware sample generation model comprises a joint probability distribution over the quantum hardware parameter distributions.

9. The computing system of claim 1, wherein the one or more quantum hardware parameter dependencies comprise one or more conditionally independent relationships between quantum hardware parameter distributions having unknown dependencies and one or more conditionally dependent relationships relating quantum hardware parameter distributions based on known dependencies.

10. The computing system of claim 1, wherein the quantum hardware sample generation model comprises a machine-learned quantum hardware sample generation model, wherein the one or more quantum hardware parameter dependencies are learned based at least in part on training the machine-learned quantum hardware sample generation model, and wherein the statistical network comprises a machine-learned neural network.

11. A computer-implemented method for simulating quantum hardware performance, the computer-implemented method comprising:

accessing, by a computing system comprising one or more computing devices, a quantum hardware sample generation model configured to generate quantum hardware samples, the quantum hardware sample generation model comprising one or more quantum hardware parameters;

sampling, by the computing system, a quantum hardware sample from the quantum hardware sample generation model; and obtaining, by the computing system, one or more simulated performance measurements based at least in part on the quantum hardware sample; wherein the one or more simulated performance measurements and the quantum hardware sample inform a subsequent fabrication of a physical quantum processor.

12. The computer-implemented method of claim 11, wherein obtaining the one or more simulated performance measurements comprises:

determining, by the computing system, one or more operating parameters using an optimization algorithm; and simulating, by the computing system, the one or more simulated performance measurements based at least in part on the one or more operating parameters.

13. The computer-implemented method of claim 12, wherein the one or more operating parameters comprise one or more operating frequencies.

14. The computer-implemented method of claim 11, wherein the method further comprises:

obtaining, by the computing system, one or more performance distances between the one or more simulated performance measurements and one or more target performance measurements; and implementing, by the computing system, a control action to adjust at least one of the one or more quantum hardware parameter distributions based at least in part on the one or more performance distances.

15. The computer-implemented method of claim 14, wherein the control action comprises one or more of incrementing, decrementing, shifting, stretching, replacing, or changing distribution type of at least one of the one or more quantum hardware parameter distributions.

16. The computer-implemented method of claim 11, wherein sampling the quantum hardware sample from the quantum hardware sample generation model comprises sampling one or more parameter samples from each of the one or more quantum hardware parameter distributions and propagating the one or more parameter samples through a statistical network comprising one or more quantum hardware parameter dependencies.

17. The computer-implemented method of claim 16, wherein sampling the one or more parameter samples comprises prior sampling the one or more parameter samples.

18. The computer-implemented method of claim 11, wherein obtaining the one or more simulated performance measurements from the quantum hardware sample comprises:

providing, by the computing system, the quantum hardware sample to a quantum circuit simulator system, the quantum circuit simulator system configured to simulate performance of the quantum hardware sample with respect to one or more test algorithms;

obtaining, by the computing system and from the quantum circuit simulator system, one or more algorithm errors with respect to the one or more test algorithms.

19. A computer-implemented method for generating quantum hardware samples simulating performance of quantum hardware, the computer-implemented method comprising:

accessing, by a computing system comprising one or more computing devices, a quantum hardware sample generation model configured to generate quantum hardware samples, wherein the quantum hardware sample generation model comprises a statistical network of one or more quantum hardware parameter distributions and one or more quantum hardware parameter dependencies;

sampling, by the computing system, the quantum hardware sample generation model to obtain a quantum hardware sample, wherein sampling the quantum hardware sample generation model comprises sampling one or more parameter samples from each of the one or more quantum hardware parameter distributions and propagating the one or more parameter samples through the statistical network based on the one or more quantum hardware parameter dependencies, wherein the quantum hardware sample informs a subsequent fabrication of a physical quantum processor.

20. The computer-implemented method of claim 19, wherein the statistical network comprises a Bayesian network.

* * * * *